US012706740B2

(12) United States Patent
Barnes

(10) Patent No.: US 12,706,740 B2
(45) Date of Patent: Aug. 11, 2026

(54) OUT-OF-BAND MECHANISMS TO ENHANCE SECURITY OF MESSAGING LAYER SECURITY (MLS) PROTOCOL-BASED COMMUNICATIONS

(71) Applicant: Cisco Technology, Inc., San Jose, CA (US)

(72) Inventor: Richard Lee Barnes, Arlington, VA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 11 days.

(21) Appl. No.: 18/887,159

(22) Filed: Sep. 17, 2024

(65) Prior Publication Data

US 2026/0081765 A1 Mar. 19, 2026

(51) Int. Cl.
*H04L 9/08* (2006.01)

(52) U.S. Cl.
CPC ............ *H04L 9/085* (2013.01); *H04L 9/0852* (2013.01); *H04L 9/0861* (2013.01)

(58) Field of Classification Search
CPC ...... H04L 9/085; H04L 9/0852; H04L 9/0861
See application file for complete search history.

(56) References Cited

U.S. PATENT DOCUMENTS 7,430,295 B1 9/2008 Pearson et al.
10,412,063 B1 9/2019 Mandich et al.
11,818,268 B2 11/2023 Vermeulen et al.
12,567,972 B2 * 3/2026 Barnes .................. H04L 9/3242
2003/0177358 A1 9/2003 Martin et al.
2011/0189981 A1 * 8/2011 Faith .................... G06Q 20/389 455/414.1
2015/0095648 A1 4/2015 Nix
2017/0201382 A1 7/2017 Lindteigen
2017/0289943 A1 * 10/2017 Zhao ....................... H04W 4/08
(Continued)

FOREIGN PATENT DOCUMENTS

WO 2022162390 A1 8/2022

OTHER PUBLICATIONS

Barnes R., et al., "RFC 9420 The Messaging Layer Security (MLS) Protocol", Internet Engineering Task Force (IETF), Standards Track, Jul. 2023, pp. 1-132. (Year: 2023).*
(Continued)

*Primary Examiner* — Jung W Kim
(74) *Attorney, Agent, or Firm* — Edell, Shapiro & Finnan, LLC

(57) ABSTRACT

Presented herein is a Message Layer Security (MLS)-based secure channel communication arrangement that involves a minimal set of changes to the MLS standard to reduce the redundant overhead in case of two-party (one-to-one or 1:1) communication. These techniques reduce the communication and computation complexity of both devices involved in establishing and supporting the one-to-one secure channel communication. Methods are provided to establish a one-to-one secure channel between a first endpoint and a second endpoint by performing a one-to-one secure channel handshake. Further, methods are provided to incorporate at least one shared secret into the cryptographic state of the one-to-one secure channel via at least one of the one-to-one secure channel handshake or a key update process.

20 Claims, 16 Drawing Sheets

(56) References Cited

U.S. PATENT DOCUMENTS

| | | | | |
|---|---|---|---|---|
| 2017/0338951 | A1 | 11/2017 | Fu et al. | |
| 2019/0097793 | A1 | 3/2019 | Nix | |
| 2019/0097794 | A1 | 3/2019 | Nix | |
| 2019/0372764 | A1 | 12/2019 | Fay | |
| 2019/0394029 | A1 | 12/2019 | Vermeulen et al. | |
| 2022/0038269 | A1 | 2/2022 | Nix | |
| 2022/0103369 | A1 | 3/2022 | Adams et al. | |
| 2022/0231843 | A1* | 7/2022 | Garcia Morchon | H04L 9/0844 |
| 2022/0377084 | A1 | 11/2022 | Zhang et al. | |
| 2022/0407688 | A1 | 12/2022 | Childe et al. | |
| 2023/0023647 | A1* | 1/2023 | Voss | H04W 12/03 |
| 2023/0308424 | A1 | 9/2023 | Nix | |
| 2023/0318817 | A1 | 10/2023 | Sattler et al. | |
| 2023/0318818 | A1* | 10/2023 | Sinha | H04L 9/083 |
| 2024/0106636 | A1 | 3/2024 | Nix | |
| 2024/0273244 | A1* | 8/2024 | Yamaura | G06F 21/82 |
| 2025/0240170 | A1* | 7/2025 | Barnes | H04L 9/3247 |

OTHER PUBLICATIONS

ETSI GS QKD 004 V2.1.1 (Aug. 2020), "Quantum Key Distribution (QKD); Application Interface, , Aug. 2020, pp. 1-22" (Year: 2020).*

Alia O., et al., "100 Gbps Quantum-safe IPsec VPN Tunnels over 46 km Deployed Fiber", arXiv:2405.04415v1 [quant-ph], May 7, 2024, pp. 1-7.

Alwen J., et al., "Modular Design of Secure Group Messaging Protocols and the Security of MLS", ACM CCS 2021, https://eprint.iacr.org/2021/1083.pdf, Aug. 23, 2021, pp. 1-107.

Alwen J., et al., "Post-Quantum MLS", Retrieved from https://datatracker.ietf.org/meeting/119/materials/slides-119-mls-post-quantum-mls-00 on Aug. 6, 2024, 2 Pages.

Avesani M., et al., "Full Daylight Quantum-key-distribution at 1550 nm Enabled by Integrated Silicon Photonics", npj Quantum Information, Jun. 8, 2021, vol. 7, No. 93, pp. 1-8.

Barnes R., et al., "RFC 9180 Hybrid Public Key Encryption", Internet Research Task Force (IRTF), Informational, Feb. 2022, pp. 1-107.

Barnes R., et al., "RFC 9420 The Messaging Layer Security (MLS) Protocol", Internet Engineering Task Force (IETF), Standards Track, Jul. 2023, pp. 1-132.

Beurdouche B., et al., "The Messaging Layer Security (MLS) Architecture", Network Working Group, draft-ietf-mls-architecture-13, Informational, Mar. 22, 2024, 46 Pages.

Cisco: "Configuring Quantum-Safe Encryption Using Postquantum Preshared Keys", https://www.cisco.com/c/en/us/td/docs/routers/ios/config/17-x/sec-vpn/b-security-vpn/m-sec-cfg-quantum-encryption-ppk.pdf, Jan. 11, 2021, pp. 1-14.

Cohn-Gordon K., et al., "On Ends-to-Ends Encryption: Asynchronous Group Messaging with Strong Security Guarantees", Cyptology ePrint Archive, Version 2.3, https://eprint.iacr.org/2017/666.pdf, Mar. 2, 2020, pp. 1-37.

Donenfeld J.A., "WireGuard: Next Generation Kernel Network Tunnel", WireGuard, Whitepaper, Draft Revision, Jun. 30, 2018, https://www.wireguard.com/papers/wireguard.pdf, Jun. 1, 2020, pp. 1-20.

Emil B., et al., "SHAKE: SHared Acceleration Key Establishment for Resource-Constrained IoT Devices", DTU, Proceedings of IEEE 6th World Forum on Internet of Things, Jun. 2-16, 2020, 7 Pages.

ETSI: "Quantum Key Distribution (QKD), Protocol and Data Format of REST-based Key Delivery API", ETSI GS QKD 014 V1.1.1, Feb. 2019, pp. 1-22.

Fluhrer S., et al., "RFC 8784 Mixing Preshared Keys in the Internet Key Exchange Protocol Version 2 (IKEv2) for Post-quantum Security", Internet Engineering Task Force (IETF), Standards Track, Jun. 2020, pp. 1-16.

Housley R., et al., "RFC 9257 Guidance for External Pre-Shared Key (PSK) Usage in TLS", Internet Engineering Task Force (IETF), Informational, Jul. 2022, pp. 1-13.

Iyengar J., et al., "RFC 9000 QUIC: A UDP-Based Multiplexed and Secure Transport", Internet Engineering Task Force (IETF), Standards Track, https://www.rfc-editor.org/rfc/rfc9000, May 2021, pp. 1-127.

Kaufman C., et al., "Internet Key Exchange Protocol Version 2 (IKEv2)", Internet Engineering Task Force (IETF), Request for Comments: 5996, Obsoletes: 4306, 4718, Standards Track, Sep. 2010, pp. 1-138.

Kiefer F., et al., "Light Clients for MLS", draft-kiefer-mls-light-00, Network Working Group, Informational, Mar. 4, 2024, 16 Pages.

Marlinspike M., et al., "The Sesame Algorithm: Session Management for Asynchronous Message Encryption", Signal, Revision 2, https://signal.org/docs/specifications/sesame/sesame.pdf, Apr. 14, 2017, pp. 1-17.

Migault D., et al., "RFC 9527 DHCPv6 Options for the Homenet Naming Authority", Internet Engineering Task Force (IETF), Standards Track, Jan. 2024, pp. 1-13.

One G., "Open-Source uProxy Extension Offers "Social" Private Browsing", Greycoder, https://greycoder.com/open-source-uproxy-extension-offers-social-private-browsing/, Sep. 21, 2015, 3 Pages.

Perrin T., et al., "The Double Ratchet Algorithm", Signal, Revision 1, https://signal. org/docs/specifications/doubleratchet/, Nov. 20, 2016, pp. 1-35.

Rescorla E., et al., "RFC 9147 The Datagram Transport Layer Security (DTLS) Protocol Version 1.3", Internet Engineering Task Force (IETF), Obsoletes: 6347, Standards Track, Apr. 2022, pp. 1-61.

Rescorla E., "HTTP Over TLS", Network Working Group, Request for Comments: 2818, Informational, May 2000, pp. 1-7.

Rescorla E., "The Transport Layer Security (TLS) Protocol Version 1.3", Internet Engineering Task Force (IETF), Request for Comments: 8446, Obsoletes: 5077, 5246, 6961, Standards Track, Aug. 2018, pp. 1-160.

Thomson M., et al., "RFC 9001 Using TLS to Secure QUIC", Internet Engineering Task Force (IETF), Standards Track, https://www.rfc-editor.org/rfc/rfc9001, May 2021, pp. 1-44.

Tor Project, "All About Tor", torproject. org, last updated on Mar. 29, 2023, 76 pages.

Wallez T., et al., "TreeSync: Authenticated Group Management for Messaging Layer Security", USENIX Association, https://www.usenix.org/system/files/sec23fall-prepub-372-wallez.pdf, last revised on Apr. 18, 2023, pp. 1-17.

Wikipedia: "Codebook", last edited on Nov. 1, 2023, Retrieved from https://en.wikipedia.org/wiki/Codebook on Sep. 3, 2024, 3 Pages.

Alwen J., et al., "Post-Quantum MLS", Retrieved from: https://datatracker.ietf.org/meeting/119/materials/slides-119-mls-post-quantum-mls-00, on Mar. 12, 2025, 5 pages.

Alwen J., et al., "Post-Quantum MLS", Retrieved from: https://datatracker.ietf.org/meeting/120/materials/slides-120-mls-pq-mls-00, on Aug. 6, 2024, 2 pages.

* cited by examiner

OUT-OF-BAND MECHANISMS TO ENHANCE SECURITY OF MESSAGING LAYER SECURITY (MLS) PROTOCOL-BASED COMMUNICATIONS

TECHNICAL FIELD

The present disclosure relates to secure communications.

BACKGROUND

The Messaging Layer Security (MLS) Protocol (RFC 9420) provides for efficient asynchronous group key establishment with forward secrecy and post-compromise security for groups in size ranging from two to thousands. However, while being designed for and efficient in large groups, it has significant overhead in the one-to-one (1:1) (two-party) case, compared to other two-party secure channel protocols.

DETAILED DESCRIPTION

Overview

Figure 1:
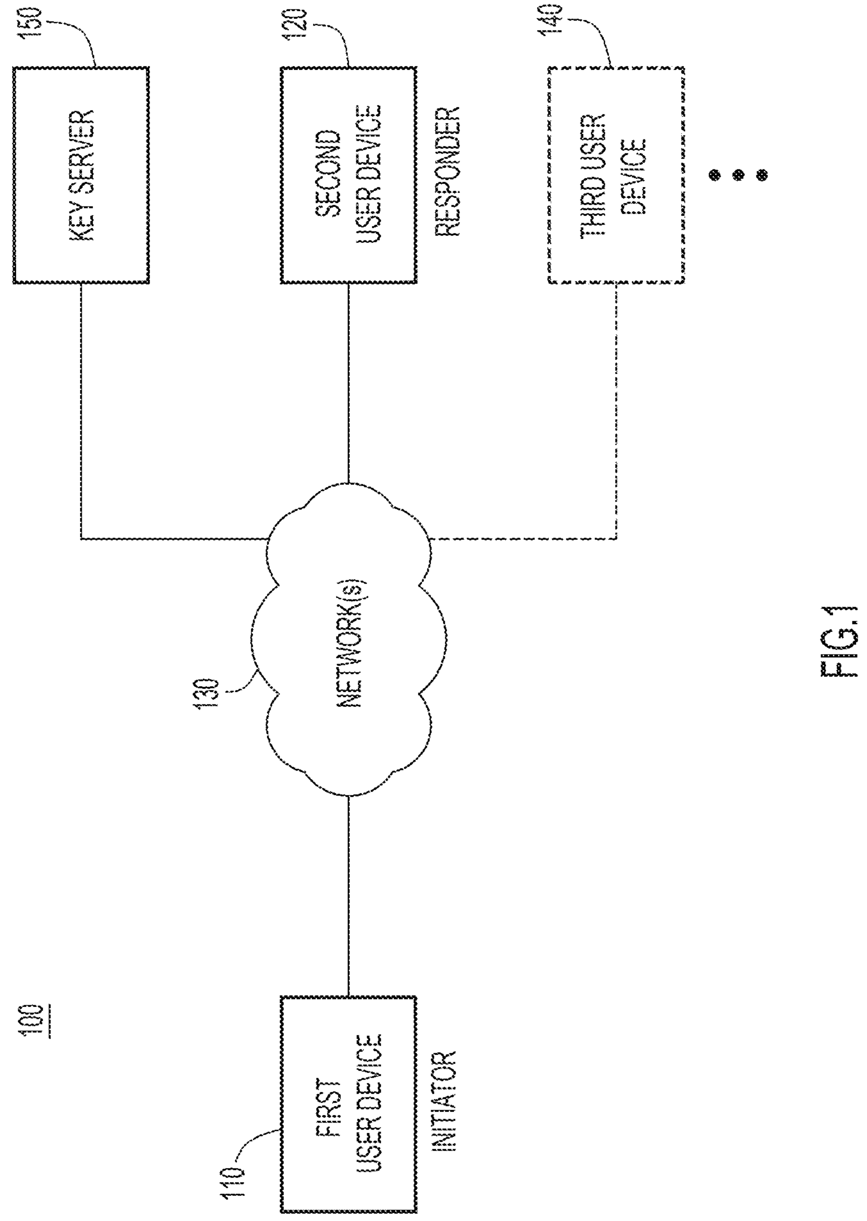
FIG. 1 is a block diagram of a system that includes two user devices configured to establish one-to-one secure channel communication, according to an example embodiment.

Techniques presented herein may increase the security of a Messaging Layer Security-based (MLS-based) two-party (one-to-one or 1:1) secure communication channel, referred to herein as a 2MLS channel, by providing additional entropy to the channel from a higher-layer security channel, communications, operations, or the like that are out-of-band (OOB) from the 2MLS channel.

In one example, a method is provided that may include providing one or more shared secrets to be stored by a first endpoint and a second endpoint through one or more OOB operations that are external to operations between the first endpoint and second endpoint involving a one-to-one secure channel through which communications are capable of being exchanged between the first endpoint and the second endpoint, wherein the one-to-one secure channel allows incorporation of the one or more shared secrets into a cryptographic state of the one-to-one secure channel through both of a one-to-one secure channel handshake and through a key update process; determining, by the first endpoint and the second endpoint, at least one particular shared secret of the one or more shared secrets that is to be incorporated into the cryptographic state of the one-to-one secure channel, wherein the determining comprises providing each of an identifier for each of the at least one particular shared secret from one of the first endpoint or the second endpoint to the other of the first endpoint or the second endpoint via at least one of the one-to-one secure channel handshake or the key update process; and engaging in secure communications between the first endpoint and the second endpoint via the one-to-one secure channel based on the cryptographic state incorporating the at least one particular shared secret.

Example Embodiments

User devices connected to the Internet need to establish "secure channels" so that they can communicate safely. A "secure channel" is a virtual connection over one or more networks that provides several security properties:

- Confidentiality—Content sent over the channel can only be accessible to the endpoints of the channel.
- Authenticity—Each endpoint is able to verify the identity of the other endpoint
- Forward Security—If either endpoint refreshes the keys in a session, an attacker that subsequently compromises either endpoint is not be able to access content sent before the refresh.
- Post-compromise Security—If either endpoint refreshes the keys in a session, an attacker that compromised either endpoint before the refresh is not be able to access content after the refresh.
- Post-quantum security—The above properties continue to hold even in the face of an attacker with a quantum computer.

The MLS group key management protocol of RFC 9420 provides these properties but has not been previously used to create secure channels.

Techniques are provided for a general cryptographic protocol with a defined relationship to the Message Layer Security (MLS) protocol of RFC 9420, with variants tailored to asynchronous environments on the one hand, and on the other hand, to synchronous, environments.

The techniques involve instantiation of MLS to two participants. MLS has significant overhead compared to other two-party secure channel protocols. A minimal set of changes to the MLS protocol are provided to reduce the communication and computation cost at both devices supporting the two-party communication.

The resulting protocol, referred to herein as "2MLS" or "2-party MLS", is targeted at two-party (one-to-one) secure channel scenarios where protocols like the Transport Layer Security (TLS) protocol or WireGuard® open-source technology are currently used. TLS, for example, is designed with two clearly distinct entities, client and server, which is built into the protocol such that the client always has to be the initiator of the transport connection. MLS is symmetric by design, and therefore allows more flexibility in its usage, and provides mutual authentication as a default. Additionally, since MLS is a key encapsulation mechanism (KEM)-and-signature based protocol, 2MLS can immediately make use of post-quantum KEM technologies without needing substantial protocol changes, unlike the TLS protocol or WireGuard technology. WireGuard® is a registered trademark of Jason A. Donenfeld.

2MLS can also be seen as an alternative to asynchronous messaging protocols (using the Extended Triple Diffie-Hellman (X3DH) and Double-Ratchet key management techniques) in a way that allows for an easy upgrade to post-quantum security and to full MLS groups.

In particular, MLS (and consequently 2MLS) supports both post-quantum secrecy (via post-quantum (PQ) KEMs) and post-quantum authentication (via PQ signatures), which Diffie-Hellman (DH)-based protocols like the Signal® protocol and WireGuard do not. Unlike TLS, MLS also supports a symmetric treatment of endpoints, where each endpoint is authenticated by its signature (even if the signature key is associated with a self-signed credential). Finally, MLS supports key updates that offer both forward secrecy and post-compromise security (like Signal, but unlike WireGuard and TLS). Signal® is a registered trademark of Signal Technology Foundation.

Unlike MLS, 2MLS is supports synchronous operation between two endpoints, without the need for a delivery service, but it can also be run as an asynchronous messaging protocol.

Session resumption is an important feature in protocols like TLS to reduce handshake latency and open multiple parallel sessions between two endpoints. Protocols like WireGuard and Signal do not support this notion of resumption. However, MLS uses resumption pre-shared keys to re-initialize a session (group), and these pre-shared keys are also used in 2MLS to support session resumption in the sense of TLS.

Supporting multiple devices (endpoints) for the same client is not supported by TLS, WireGuard, or Signal. However, Signal-based applications use mechanisms like sender keys to achieve multi-device support. 2MLS can support multiple devices in similar ways.

2MLS occupies a distinct spot that combines many of the features of TLS 1.3, WireGuard, and Signal while offering improved post-quantum security, symmetric connections, and the unique advantage of being able to smoothly scale to larger groups. With further modifications it is also possible to support resumption to support multiple channels, and multi-device connections.

A core 2MLS handshake is defined herein that provides the comparable security guarantees and performance as TLS 1.3, WireGuard, and the other predecessors discussed above. It assumes the existence of an authentication or public key infrastructure (PKI) that issues and validates credentials for endpoints, and optionally, a server where endpoints can upload and download key packages to speed up connection establishment. Any protocol that uses the transport keys generated by 2MLS may be used to encrypt application data. In particular, the 2MLS handshake protocol could be used with the Transmission Control Protocol (TCP), the QUIC, the User Datagram Protocol (UDP) or with an application-specific protocol.

Different mechanisms/operations are described herein for providing one or more shared secrets to be stored by endpoints such at least one particular shared secret of the one or more shared secrets can be incorporated into the cryptographic state of the 2MLS channel.

Additionally, various operations/mechanisms are also defined herein that facilitate providing one or more shared secrets that are to be stored by two parties/endpoints for the incorporation of at least one of the shared secrets into the cryptographic state of a 2MLS secure channel through which the endpoints can communicate. The mechanisms/operations for providing the one or more shared secrets can broadly be characterized as 'out-of-band (OOB) operations' in that the operations are OOB/external to operations that can be performed between the endpoints for establishing/updating the 2MLS channel through which communications between the endpoints can be exchanged.

In some instances, the OOB operations can include facilitating the establishment of one or more OOB 'shared secrets' channels through which one or more shared secrets can be provided to two parties/endpoints involved in communications via a 2MLS channel. Such 'shared secrets' channels (and shared secrets obtained by the endpoints therefrom) are considered to be OOB from the 2MLS secure channel through which two parties/endpoints can communicate. The endpoints can negotiate a particular shared secret(obtained/stored via the shared secrets channel) in order to add a layer of entropy to 2MLS communications exchanged between the two endpoints.

In some instances, providing the one or more shared secrets can include OOB operations through which endpoints exchange one or more wireless communications that facilitate communicating the one or more shared secrets between the endpoints.

In some instances, providing the one or more shared secrets may include OOB operations such as generating a quick-response (QR) code by one of the endpoints in which the QR code includes the one or more shared secrets. The QR code can be captured by the other of the endpoints and decoded in order to obtain/store the one or more shared secrets. In some instances, providing the one or more shared secrets can include a user of a first endpoint manually creating a particular shared secret and a user of a second endpoint viewing the particular shared secret via the first endpoint or being told the particular shared secret and manually providing the particular shared secret for the second endpoint.

In still some instances, providing the one or more shared secrets may include OOB operations such as performing a measurement of a physical phenomenon observed by at least one of a first endpoint and a second endpoint.

In still some instances, providing the one or more shared secrets may include OOB operations such as manually providing endpoints with a pool of shared secret bytes (e.g., via a file that can be downloaded/installed on devices). In such instances, at least one shared secret value that is to be incorporated into the cryptographic state of a 2MLS channel can be identified by identifying (between the endpoints) at least one range of byes from the pool that define the shared secret value(s). Other variations for providing one or more shared secrets to be stored by endpoints for incorporating into the cryptographic state of a 2MLS secure channel can be envisioned through any combination of operations/mechanisms as discussed herein.

In at least one instance, providing the one or more shared secrets may include OOB operations through which at least one Quantum Key Distribution (QKD) shared secrets channel can be established for two endpoints in which shared secrets can include quantum keys provided to the endpoints via the at least one QKD shared secrets channels. In at least one instance, the shared secrets can be pre-shared keys (PSKs) in which each PSK can be identified using an PSK identifier (PSK-ID) that uniquely identifies each PSK.

Reference is now made to FIG. 1. FIG. 1 illustrates a block diagram of a system 100 that includes a first user device 110 and a second user device 120 that are capable of communicating over one or more networks 130. The one or more networks 130 may include any combination of wireless or wired local area networks and wireless or wired wide area networks (e.g., the Internet).

The first user device 110 and the second user device 120 are configured to support a one-to-one communication employing a one-to-one secure channel handshake and other techniques presented herein, according to an example embodiment. The first user device 110 may also be referred to as a first endpoint and the second user device 120 may be referred to as a second endpoint. The first user device (endpoint) 110 may be a 2MLS Initiator (or simply "Initiator") and the second user device (endpoint) 120 may be a 2MLS Responder (or simply "Responder"). The first user device 110 and the second user device 120 may be configured to add to their secure channel, once established, one or more other user devices (endpoints), as indicated by the third user device 140, and so on. In some implementations, a PKI key server 150 may be involved, where the Responder obtains a key package for the Initiator by downloading it from the PKI key server 150, instead of the Initiator sending it to the Responder.

Figure 11:
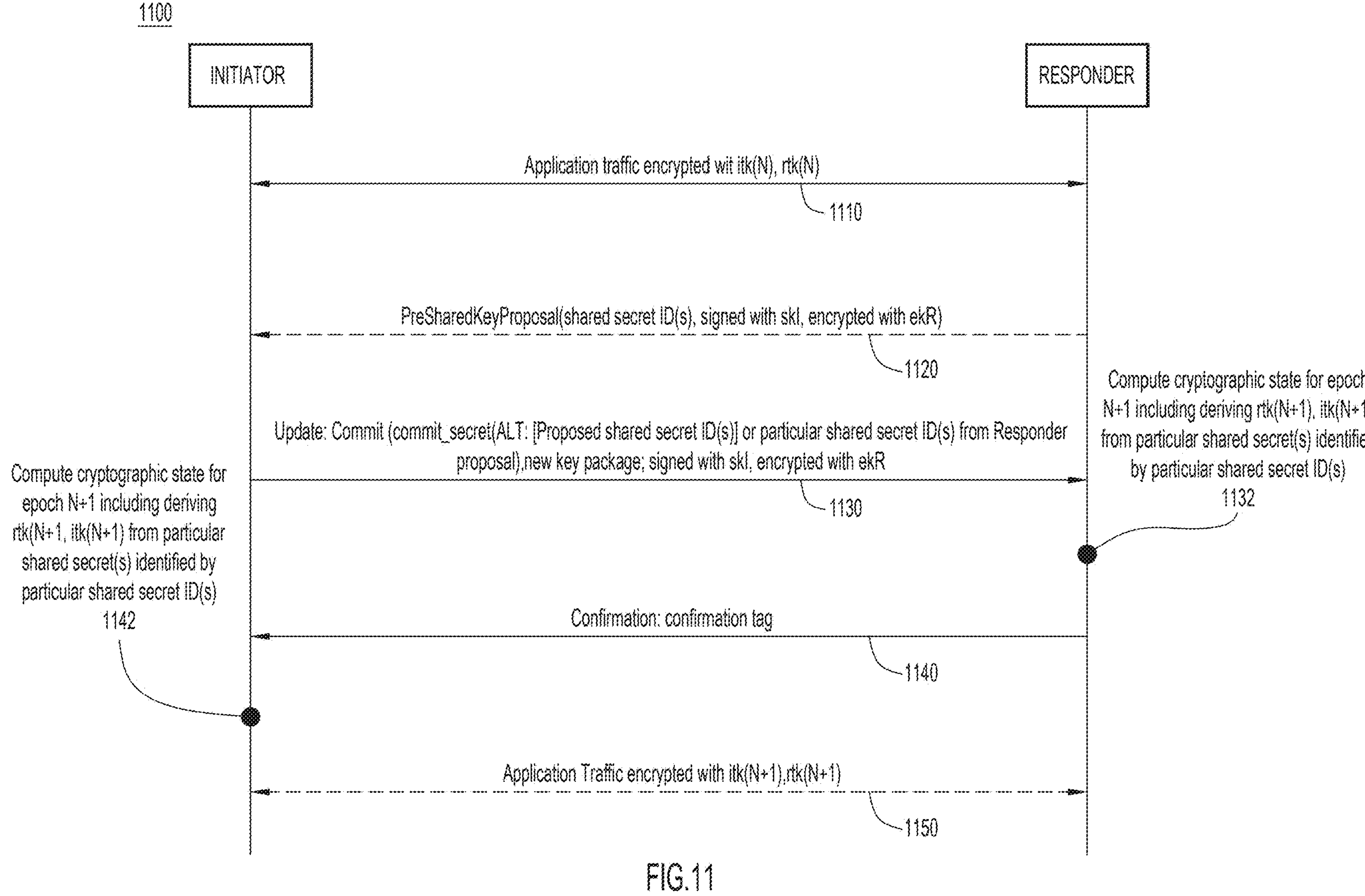
FIG. 11 is a sequence diagram depicting other example operations for determining, between two parties (an Initiator and a Responder), at least one particular shared secret to be incorporated into a cryptographic state of a one-to-one secure channel via a key update process, according to an example embodiment.

The user devices (endpoints) shown in FIG. 1 and referred to herein may be stand-alone devices, such as desktop computers, laptop computers, mobile phones, tablet computers, or any other suitable device now known or hereinafter developed that enables communication between or among two or more parties, etc. An example high-level block diagram of a suitable user device is shown in FIG. 11, described below. In addition, the user devices (endpoints) may be entirely virtualized in the cloud through any virtualization technology now known or hereinafter developed.

Terminology

Some terminology used herein is similar to the terminology used in RFC 9420 for the Messaging Layer Security (MLS) Protocol, but again, directed to establishing a secure channel between two parties.

Client (Also Referred to as Endpoint and Party):

An agent that uses this protocol to establish shared cryptographic state with other clients. A client is defined by the cryptographic keys it holds.

Group:

A group represents a logical collection of clients that share a common secret value at any given time. The state of the group is represented as a linear sequence of epochs in which each epoch depends on its predecessor. A 2MLS group has only 2 clients, but a 2MLS group can be converted to an MLS group, as described herein.

Epoch:

A state of a group in which a specific set of authenticated clients hold a shared cryptographic state. Thus, as in the MLS protocol, the history of a group is divided into a linear sequence of epochs. In each epoch, a set of authenticated members agree on an epoch secret that is known only to the members of the group in that epoch.

Member:

A client that is included in the shared cryptographic state of a group and hence has access to the group's secrets.

Key Package (KeyPackage):

A signed object describing a client's identity and capabilities, including a hybrid public key encryption ((HPKE) of Internet Engineering Task Force (IETF) RFC 9180) public key that can be used to encrypt to that client. Other clients can use a client's KeyPackage to introduce the client to a new group.

Signature Key:

A signing key pair used to authenticate the sender of a message.

PublicMessage:

A message that is signed by its sender and authenticated as coming from a member of the group in a particular epoch, but not encrypted.

PrivateMessage:

A message that is signed by its sender, authenticated as coming from a member of the group in a particular epoch, and encrypted so that it is confidential to the members of the group in that epoch.

Key Derivation Function (KDF): A cryptographic algorithm that derives one or more secret keys from a secret value using a pseudorandom function, such as a cryptographic hash function or block cipher. KDFs can stretch keys into longer keys of a desired format. As discussed herein, in some embodiments, a secret value utilized by a KDF may be a shared secret value determined from a shared secret provided/stored by endpoints communicating via a 2MLS channel.

Application Message:

A PrivateMessage carrying application data.

In general, symmetric values are referred to as "keys" or "secrets" interchangeably. Either term denotes a value that is to be kept confidential to a client. When labeling individual values, the term "secret" refers to a value that is used to derive further secret values and "key" to refer to a value that is used with an algorithm such as Hashed Message Authentication Code (HMAC) or an Authenticated Encryption with Associated Data (AEAD) algorithm.

Figure 2C:
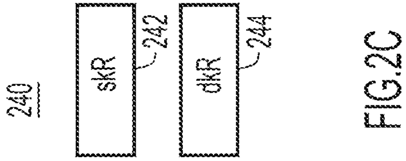
FIGS. 2A, 2B and 2C illustrate cryptographic material related to states of an Initiator and a Responder, which are used in the course of the to-one secure channel communication techniques presented herein, according to an example embodiment.
Figure 2B:
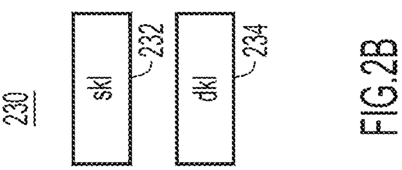
Figure 2A:
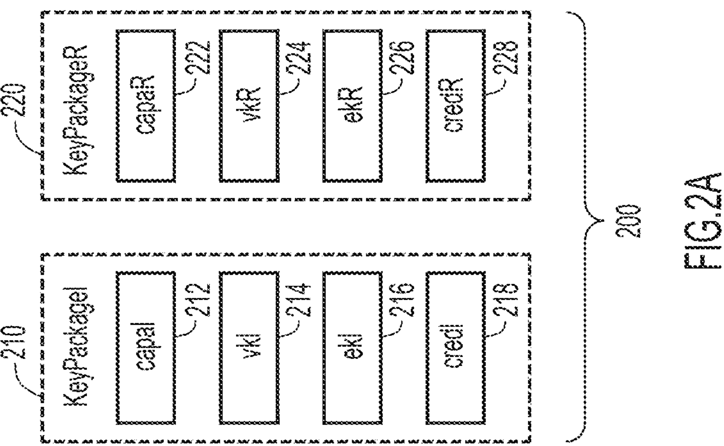

FIGS. 2A, 2B and 2C illustrate cryptographic material related to states of an Initiator and a Responder, which are used in the course of the techniques presented herein.

FIG. 2A shows information related to the shared public/published state 200 of each of an Initiator (I) and a Responder (R). The shared public state is included in a key package for each of the Initiator and Responder. The Initiator key package denoted KeyPackageI 210 includes information (contained in designated fields) indicating Initiator capabilities denoted capaI 212, an Initiator signature verification key denoted vkI 214, an Initiator encryption key denoted ekI 216 (also referred to herein as the Initiator's ephemeral public encryption key), and an Initiator credential denoted credI 218. Similarly, the Responder key package denoted KeyPackageR 220 includes information indicating Responder capabilities denoted capaR 222, a Responder signature verification key denoted vkR 224, a Responder encryption key denoted ekR 226 (also referred to herein as the Responder's ephemeral public encryption key), and a Responder credential denoted credR 228.

A 2MLS endpoint can generate a key package for itself at any time. The credential that is part of the key package may be obtained by a party from an authentication service. The authentication service is configured to issue a credential to those parties that authenticate their identity to the authentication service.

FIG. 2B shows the Initiator secret state 230. The Initiator secret state 230 includes an Initiator signature key denoted skI 232 and an Initiator decryption key dkI 234. Similarly, FIG. 2C illustrates the Responder secret state 240. The Responder secret state 240 includes a Responder signature encryption key denoted skR 242 and a Responder decryption key dkR 244. All of the keys shown in FIGS. 2A, 2B and 2C are asymmetric keys.

Thus, the Initiator has a public encryption key and an associated or counterpart private decryption key that it can use to decrypt content that has been encrypted by another party (e.g., the Responder) with the Initiator's public encryption key. Similarly, the Responder has a public encryption key and an associated or counterpart private key that it can use to decrypt content that has been encrypted by another party (e.g., the Initiator) with the Responder's public encryption key. Generally, one computation/operation is used to generate the public encryption key and the associated private decryption key(encryption/decryption key pair), such as that described in IETF RFC 7748, which describes how to generate a key pair using elliptic curve cryptographic techniques, and IETF RFC 9180 HPKE describes how those keys are used to do encryption.

In an analogous manner, the Initiator and Responder use an algorithm, such as that presented in IETF RFC 8032, to generate the signature (signing key) and signature verification (verifying key) key pair. Each party includes the signature verification key in its key package that it shares with another party but maintains the signature key secret. So only one party can sign content with the signature key, but any party with the signature verification key can verify the signature on signed content, indicating that only that authorized/authentic party provided the signed content. Thus, signature (signing) keys and decryption keys are private/secret keys, whereas encryption keys and signature verification keys are public keys.

The Initiator generates a fresh key package to provide to the Responder. Cipher suites, other than the one indicated in a CipherSuite field of the key package, that the Initiator supports, are listed in the field for capaI 212. A cipher suite is a set of cryptographic algorithms used to create keys and encrypt information. Cipher suites may be used to negotiate security settings during the handshake. For example, a cipher suite may specify an algorithm for each of (a) key exchange algorithm, (b) bulk encryption algorithm, and (c) message authentication code (MAC) algorithm. When providing the Initiator KeyPackage, the signature key needs to be present, but the credential may be omitted if the sender wishes to be anonymous at this stage of the protocol.

Thus, the key package defines the proposed session parameters, including a version and cipher suite, an ephemeral key encapsulation mechanism (KEM) public key encryption key, credential, signature key, a signature, and a private key corresponding to the signature key over the key package.

The One-to-One Secure Channel Handshake

Figure 3A:
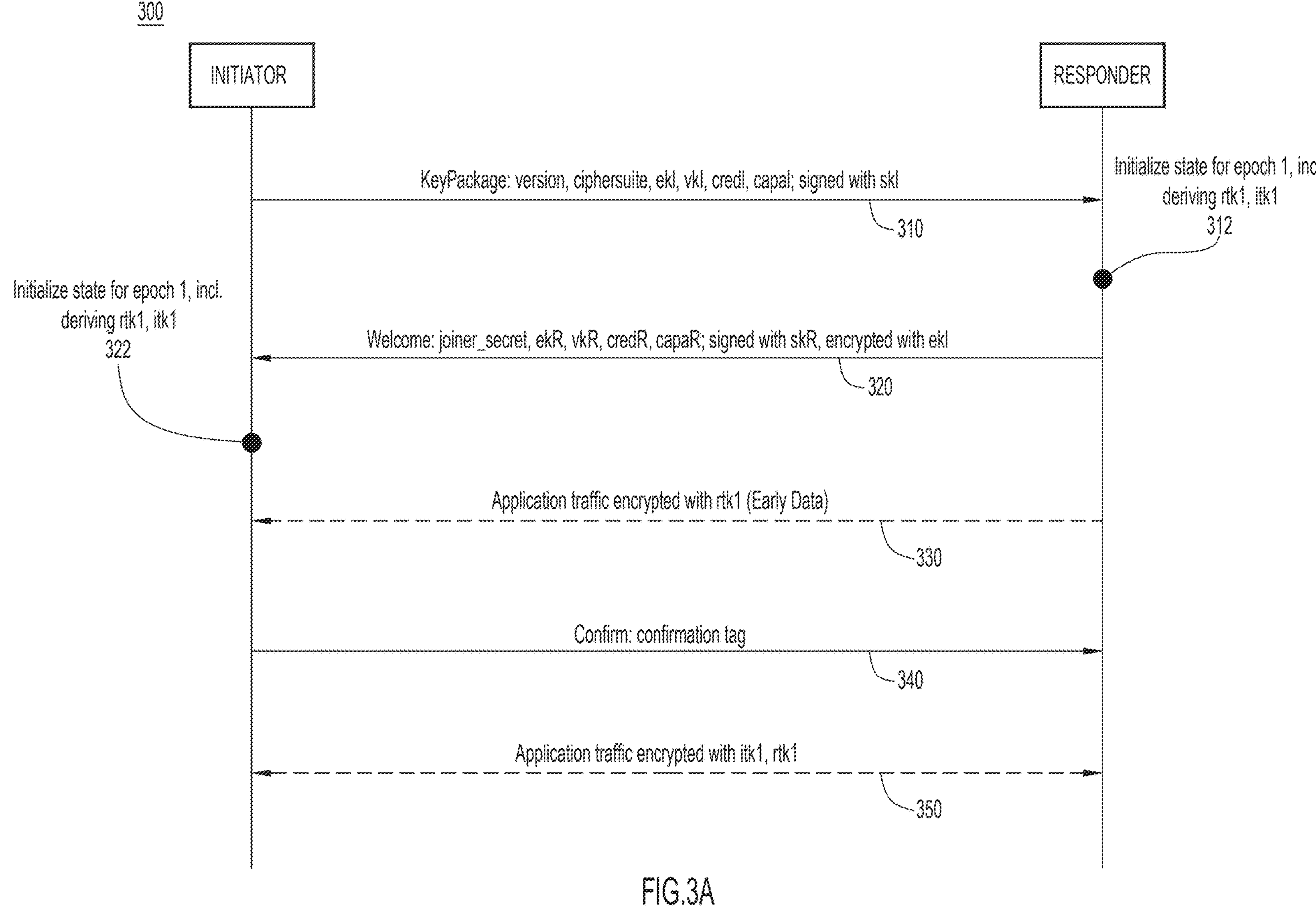
FIG. 3A is a sequence diagram depicting a one-to-one secure channel handshake to establish secure channel communication between two user devices, according to an example embodiment.

Reference is now made to FIG. 3A. FIG. 3A is a sequence diagram for a one-to-one secure channel handshake 300, according to an example embodiment.

The one-to-one secure channel (2MLS) handshake 300 generally operates as follows. A Responder obtains the Initiator key package (KeyPackageI) either by downloading it from a key server, e.g., PKI key server 150 shown in FIG. 1, or by the Initiator sending it to the Responder. In either case, the Responder can accept the connection with the Initiator and send a Welcome message to the Initiator. At this point, the Responder can start sending encrypted message to the Initiator (referred to as Early Data). After verifying the Welcome message, the Initiator sends a Confirm message to the Responder. After that, the two parties may freely exchange encrypted messages (in both directions).

The one-to-one secure channel (2MLS) handshake 300 is now described in more detail. As shown at step 310, the Initiator sends to the Responder a KeyPackage message containing the Initiator's key package, referred to above as KeyPackageI in FIG. 2A. Alternatively, the Responder downloads the Initiator's key package from a key server. In any case, the Initiator's key package includes: version information and cipher suite, an ephemeral KEM public key encryption key(ekI), the Initiator's credential (credI), the Initiator's verification key(vkI), and the Initiator's capabilities (capaI), all of which are signed with the Initiator's secret/private signature key(skI). That is, the Initiator generates a signature using its signature key over the entire contents of the Initiator key package.

An example of the structure of a key package is shown below.

```
struct {
  HPKEPublicKey encryption_key;
  optional<SignaturePublicKey> signature_key;
```

-continued

```
    optional<Credential> credential;
    Extension extensions<V>;
    Capabilities capabilities;
} 2KeyPackage;
struct {
    ProtocolVersion version = 2mls10;
    CipherSuite cipher_suite;
    2KeyPackage key_package;
} 2MlsKeyPackageTBS;
struct {
    2MlsKeyPackageTBS key_package_tbs;
    /* SignWithLabel(signing_key, "2MlsKeyPackage",
    key_package_tbs) */ opaque
    signature<V>;
} 2MlsKeyPackage;
```

The initial cryptographic state for the handshake is denoted epoch 0, where the epoch is indicated by parenthetical with respect to the secret state. For example, the secret state at epoch 0 is "secret(0)" and the secret state at epoch 1 is "secret(1)" and so on. Once the Responder receives/obtains the Initiator's key package, as shown at step 312, the Responder initializes state for epoch 1 and derives a responder traffic key for epoch one, called rtk1. If the Responder agrees with the parameters of the Initiator's key package, at step 320 the Responder creates and sends to the Initiator a Welcome message. If the Responder does not support the provided parameters, the Responder may respond with a retry message containing the Responder's key package, as described below.

The Welcome message includes a joiner_secret, Responder's ephemeral public encryption key(ekR), Responder's verification key(vkR), Responder's credential (credR), Responder's capabilities (capaR), all of which are signed with the Responder's signature key(skR) and encrypted with the Initiator's public ephemeral encryption key(ekI). Thus, the Welcome message includes a joiner_secret, a session identifier (session_id) and the Responder's key package (containing the Responder's encryption key, Responder's signature verification key) but the Responder's credential is optional. The session_id, which corresponds to the group identifier in RFC9420, and the joiner_secret may be chosen at random with length of the digest in the cipher suite.

The Welcome message also contains a message authentication code (MAC) computed using a welcome_confirmation_key, derived from the exporter_secret, over the transcript so far, i.e., the KeyPackage and WelcomeTBM. Finally, the Welcome message contains a signature using the Responder's signature key, and all the above are encrypted using hybrid public key encryption (HPKE) under the Initiator's encryption_key.

The transcript hashes used in 2MLS are different from those in MLS. 2MLS includes the full contents of the KeyPackage and Welcome in the transcript hashes, whereas MLS only includes parts of their contents. This hash over the full contents can be performed in 2MLS since there are only two parties and so all parties can agree on these contents.

```
key__package__transcript__hash = Hash(2MlsKeyPackage)
welcome__transcript__hash__tbm = Hash(2MlsKeyPackage ||
2MlsWelcomeTBM)
```

In particular, the welcome_transcript_hash_tbm includes all the session parameters, key material, and credentials exchanged so far in the protocol and hence contains all the elements included in the MLS GroupContext.

Once the Welcome message is sent, epoch 1 is entered. To derive the keys for this epoch, the MLS Key Schedule is run, using the joiner_secret, and using the welcome_transcript_hash_tbm in place of the GroupContext. The exporter_secret is then derived and used to derive all other keys, including the welcome_key.

```
welcome__key = DeriveSecret(exporter__secret, "2MlsWelcomeTag")
welcome__tag = Mac(welcome__key, welcome__transcript__hash__tbm)
```

The welcome_tag is an additional MAC used in 2MLS which does not appear in MLS. It serves to bind the derived keys to the complete transcript so far, providing strong agreement between the two parties on all protocol parameters.

An example of the structure of the Welcome message is provided below.

```
struct {
    opaque joiner_secret<V>;
    opaque session_id<V>;
    uint32 epoch = 0;
    2KeyPackage key_package;
} 2MlsWelcomeTBM;
struct {
    2MlsWelcomeTBM welcome_tbm;
    /* MAC(welcome_key, welcome_transcript_hash_tbm) */ Mac
    welcome_tag;
} 2MlsWelcomeTBS;
struct {
    2MlsWelcomeTBS welcome_tbs;
    /* SignWithLabel(signing_key, "2MlsWelcome", welcome_tbs) */
    opaque signature<V>
} 2MlsWelcomeTBE;
struct {
    optional<KeyPackageRef> key_package_ref;
    /* EncryptWithLabel(peer_encryption_key, "2MlsWelcome",
key_package_transcript_hash, 2MlsWelcomeTBE) */
    HPKECiphertext encrypted_welcome;
} 2MlsWelcome;
```

Herein, the notation "TBE" means "to be encrypted," the notation "tbm" means to be MAC'd (message authentication code computed), and "tbs" means "to be signed."

Thus, to summarize, the Welcome message comprises: welcome content including a joiner secret(that the Responder generates using the key schedule, described below in connection with FIG. 3B), a session identifier, a Responder ephemeral public encryption key and a Responder signature verification key(in which the Responder ephemeral public encryption key and the Responder signature verification key are part of the Responder's key package); a welcome tag that is a message authentication code computer over a welcome transcript using a welcome key derived from the joiner secret, wherein the welcome transcript comprises the Initiator key package and the welcome content; and a signature computed over the welcome content and the welcome tag using the Responder signature key.

After the Initiator receives the Welcome message, at step 322, the Initiator can initialize the state for epoch 1, including deriving the responder traffic key, rtk1 to decrypt traffic that the Responder may send to the Initiator. That is, after sending the Welcome message, at step 330 the Responder can send so called Early Data, encrypted under the responder traffic key, rtk1, corresponding to the early_data_secret derived from the exporter_secret. Step 330 is entirely optional to the Responder.

The Initiator verifies the Welcome message by decrypting the (encrypted) Welcome message using the Initiator's private decryption key that corresponds to the Initiator's ephemeral public encryption key, verifying the signature of the Welcome message using the Responder's signature verification key, and then verifying the welcome tag in the Welcome message. The Initiator verifies the welcome tag by recomputing a welcome transcript to produce a recomputed welcome transcript and generating a derived welcome key from the recomputed welcome transcript. Then, the Initiator recomputes a message authentication code using the recomputed welcome transcript and the derived welcome key to produce a recomputed message authentication code. Next, the Initiator compares the recomputed message authentication code with the message authentication code of the welcome message; if they match, then the welcome tag (and thus the Welcome message) is verified.

At step 340, after the Initiator verifies the Welcome message that it receives from the Responder, the Initiator sends a confirmation message. The confirmation (confirm) message includes a confirmation tag that is based on a message authentication code (MAC) that is computed based on a confirmation key that is derived from the exporter secret over the transcript hash.

```
welcome__transcript__hash = Hash(2MlsKeyPackage || 2MlsWelcome)
confirmation__key = DeriveSecret(exporter__secret, "2MlsConfirm")
confirmation__tag = Mac(confirmation__key, welcome__transcript__hash)
```

The confirmation message is a new message in the 2MLS handshake that does not exist in RFC 9420. An example of the structure of the confirmation message is:

```
struct {
  /* MAC(confirmation_key, welcome_transcript_hash) */ Mac
  confirmation_tag;
} 2MlsConfirm;
```

Said another way, the Initiator generates the confirmation tag based on a MAC operation performed over a confirmation key and a hash of the welcome transcript. The confirmation key is derived from the exporter secret which is derived according to the key schedule described below in connection with FIG. 3B.

After the Initiator sends the confirmation message, the Initiator derives new transport keys for epoch 1 from the exporter secret and the full transcript hash. At this point, the Initiator can start sending encrypted application data and once the Responder receives the confirmation message, the Responder stops sending Early Data and sends application traffic using rkt1 to the Initiator at step 350:

```
confirm__transcript__hash = Hash(2MlsKeyPackage || 2MlsWelcome ||
2MlsConfirm)
```

Thus, at step 350, the Initiator and the Responder can send encrypted traffic to each other.

When the Initiator's identity should not be sent in public, the initial key package may contain an empty credential. The Initiator can then send an Update message immediately after the Confirm message to provide its credential and authenticate the key exchange.

To summarize, the 2MLS handshake depicted in FIG. 3A, unlike MLS, employs a more comprehensive transcript in that the Initiator's key package and the Welcome message get included in the transcript that gets folded in the generation of the various keys by the Initiator and Responder to send encrypted traffic to each other. This stronger binding of security material between the Initiator and Responder can be achieved because there are only two parties involved. That is, the party that obtained the key package (the Responder) and the party that received the welcome message (the Initiator) can agree/confirm that they sent and received the same messages (by computing values from the transcript of those messages that are the same).

The "welcome content" included in the "Welcome message" sent from the Responder to the Initiator at 320 consists of the joiner secret, session ID and Responder key package. The "welcome transcript" comprises (a) the Initiator's key package and (b) the welcome content. The Welcome message comprises: the welcome content, a "welcome tag" that is a MAC over the welcome transcript using a "welcome key" derived from the joiner secret, a signature over the welcome content and the welcome tag by the Responder's private signature key, all of the above encrypted with the Initiator's public encryption key to produce an encrypted Welcome message.

The Initiator verifies the Welcome message by: decrypting the encrypted welcome message using the Initiator's private decryption key(corresponding to the Initiator's public encryption key), verifying the signature using the Responder's public signature verification key (corresponding to the Responder's private signature key), computing the welcome transcript and deriving the welcome key, and verifying the welcome tag by recomputing the MAC using the welcome transcript and welcome key. If the recomputed MAC matches the MAC contained in the Welcome message, then the Welcome message is said to be verified.

As discussed for embodiments herein, below, the core 2MLS handshake can be enhanced to include the include an exchange of identifiers for shared secret information between endpoints for a particular shared secret that is to be incorporated into the cryptographic state of the 2MLS channel, as discussed in further detail herein, below.

Key Schedule—Transport Encryption Key Handling

Figure 3B:
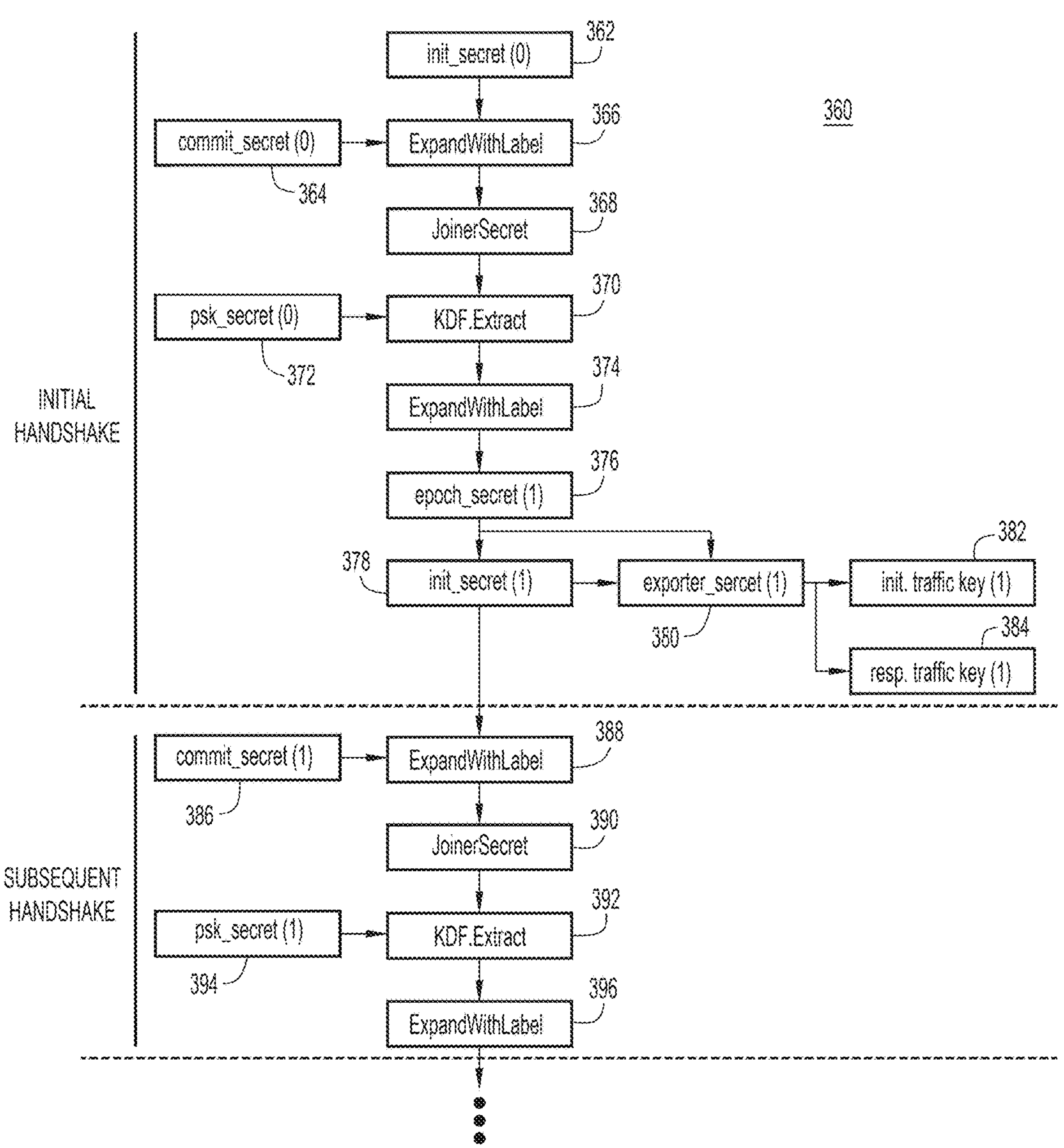
FIG. 3B is a diagram depicting a key schedule of a shared secrete state between two parties for the one-to-one secure channel communications, according to an example embodiment.

FIG. 3B is a diagram depicting a key schedule 360 associated with the cryptographic state of a 2MLS channel between two endpoints. All values of the cryptographic state in the key schedule 360 are symmetric secrets. There are cryptographic states involved in an initial handshake exchange and cryptographic states involved in a subsequent handshake exchange, as described further below. Keys are derived using Extract and Expand functions from the Key Derivation Function (KDF), as well as the functions defined below.

```
ExpandWithLabel(Secret, Label, Context, Length) = KDF.Expand(Secret,
KDFLabel, Length)
DeriveSecret(Secret, Label) = ExpandWithLabel(Secret, Label, "",
KDF.Nh)
```

A KDFLabel is defined as:

```
struct {
  uint16 length;
  opaque label<V>;
  opaque context<V>;
} KDFLabel;
```

The value KDF.Nh is the size of an output from KDF.Extract, in bytes. In FIG. 3B, KDF.Extract takes its salt argument from the top and its Input Keying Material (IKM) argument from the left, and 0 represents an all-zero byte string of length KDF.Nh.

When processing a handshake message, an endpoint combines the following information to derive new epoch secrets:

The initial (init) secret(init_secret) 362; and

The commit secret(commit_secret) 364 for the current epoch. The commit_secret 364 may initially be zero or more shared secrets for epoch 0.

Given these inputs, the derivation of secrets for an epoch proceeds as shown in FIG. 3B, where a KDF ExpandwithLabel function 366 is performed based on the init secret 362 and commit_secret 364 to produce the joiner secret(JoinerSecret) 368.

At 370, using zero or more injected pre-shared keys (psk_secret) during the initial handshake, denoted psk_secret(0) 372, which may be zero during the initial handshake or may correspond to at least one particular shared secret that is to be incorporated into the cryptographic state of the 2MLS channel, as discussed for embodiments herein, a KDF Extract function is performed using the joiner secret, followed by an ExpandwithLabel function 374, to produce an epoch secret(epoch_secret(1)) 376.

At each epoch, a transport encryption key is exported from the key schedule as follows. In the initial handshake, after the Welcome message is sent, the current transcript hash is the welcome_transcript_hash, and so the early data secret derived as:

```
early__data__secret = ExpandWithLabel(exporter__secret,
"2MlsEarlyData", welcome__transcript__hash, KDF.Nk)
```

Thus, the epoch_secret(1) is used as the init_secret(1) 378 (also called early_data_secret) and the exporter_secret(1) 380.

This secret is then provided to the transport encryption layer, so that it can use it to protect early data messages.

Once the confirmation message has been sent, the transport secret for the epoch 1 is derived as:

```
transport__secret = ExpandWithLabel(exporter__secret, "2MlsTransport",
confirm__transcript__hash, KDF.Nk)
```

The epoch secret is thus used to derive a number of values for different purposes, including to derive deriving keys to encrypt sender data, e.g., the init. traffic key(1) 382 and resp. traffic key(1) 384, the exporter_secret used to derive exported secrets, the confirmation_key involved in computing the confirmation MAC for an epoch, etc.

Thus, the Initiator traffic key(init. traffic key(1)) 382 and the Responder traffic key (resp. traffic key(1)) 384 are generated from the exporter secret using the ExpandWithLabel function shown above.

In a subsequent handshake, zero or more shared secrets, such as a commit_secret(1) 386 for a subsequent epoch can be provided as input to an ExpandWithLabel function 388 to produce a Joiner Secret 390, which is then provided to a KDF.Extract function 392, which can take as input(s) zero or more shared secrets (determined/identified by the endpoints from one or more shared secrets provided to the endpoints), such as a psk_secret(1) 394, followed by an ExpandWithLabel function 396, and so on, similar to operations 376, 378, etc., shown above in FIG. 3B.

Retry

As explained above in connection with FIG. 3A, if the Responder does not support the cipher suite offered by the Initiator but does support another cipher suite listed in the Initiator's capabilities, the Responder responds with a Retry message, and the handshake switches. The Retry message contains the Responder's key package, and this key package needs to correspond to one of the protocol versions and cipher suites indicated in the capabilities section of the Initiator's key package.

```
struct {
  2MlsKeyPackage key_package;
} 2MlsRetry;
```

Then, the Initiator responds with the Welcome message (instead as the Responder would in the regular flow shown in FIG. 3A). The transcript hashes used in the Welcome message are computed as follows:

```
key__package__transcript__hash = Hash(2MlsKeyPackage || 2MlsRetry)
welcome__transcript__hash__tbm = Hash(2MlsKeyPackage || 2MlsRetry ||
2MlsWelcomeTBM)
```

The subsequent confirmation message goes from the Responder to the Initiator and is computed as usual, using the transcript hash as follows:

welcome_transcript_hash=Hash (2MlsKeyPackage||2MlsRetry||2MlsWelcome)

The final transcript hash then becomes:

```
confirm__transcript__hash = Hash(2MlsKeyPackage || 2MlsRetry ||
2MlsWelcome || 2MlsConfirm)
```

Pre-Published Key Package

As described above, in some settings, an Initiator may be willing to upload key packages to a key server, so that one or more Responders can download the Initiator's key package and thereafter directly send Welcome messages to the Initiator. This is referred to as a Prekey Flow. It is similar to the regular 2MLS handshake flow shown in FIG. 3A, except that the first Key Package message is sent/downloaded out-of-band via a key server to a Responder.

It is noted that if the Initiator is willing to accept multiple Welcome messages encrypted to the same key package, then the Welcome message in the Prekey Flow becomes vulnerable to replay attacks. Furthermore, in this case, the Early Data messages are also vulnerable to replay and are not forward secret if the key package's decryption key is eventually compromised. These messages essentially have the same security as 0-RTT messages in TLS 1.3.

One way to strengthen the security of these messages is to impose a one-time use only policy on uploaded key packages. Otherwise, the Responder should not send any Early Data until it receives the confirmation message from the Initiator. Furthermore, if key packages are reused, the Initiator should ensure that it does not accept any Welcome message twice.

In the Prekey Flow, the Initiator may send an update message immediately after the confirm message so that it can refresh the session keys and obtain strong forward secrecy guarantees.

Key Update Processes

Figure 4:
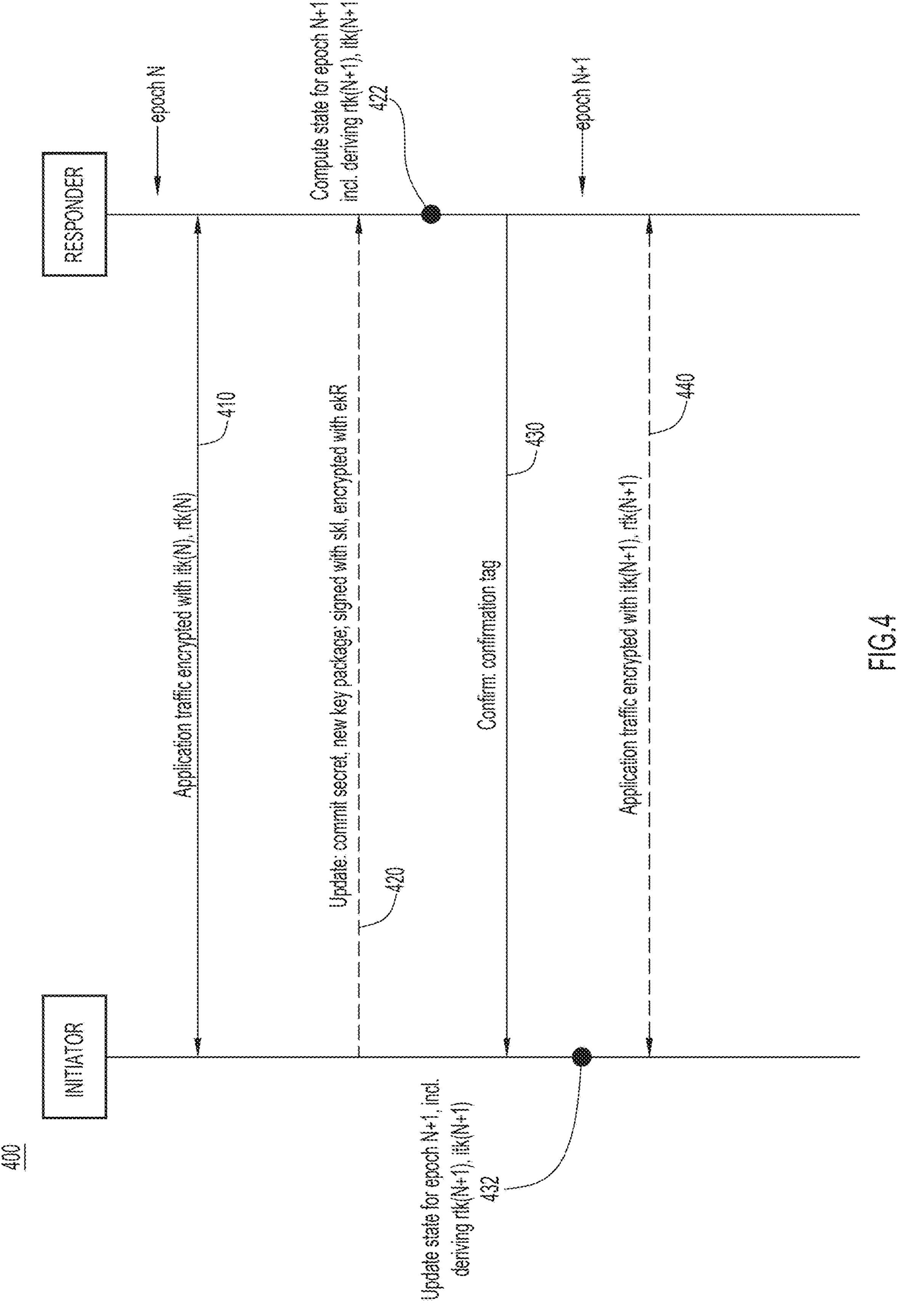
FIG. 4 is a sequence diagram for a key update process that can be utilized in different scenarios, according to an example embodiment.

Reference is now made to FIG. 4, which illustrates a sequence diagram for a key update process 400 that may be utilized to provide post-compromise security to update the cryptographic state of a 2MLS channel established between two endpoints and to open new epochs. Each epoch creates a new exporter_secret and a new confirm_transcript_hash and the transport_secret is derived in the same way as described above. At any point after the initial handshake, either party can ratchet the protocol to obtain a fresh key, providing forward secrecy (FS) and post-compromise security (PCS). Thus, as shown at 410, the Initiator and Responder are communicating application traffic for epoch N using the Initiator transport key itk(N) and the Responder transport key rtk(N).

At some point, one of the parties decides to update the keys for communicating with the other party. In the example shown in FIG. 4, the Initiator is the party that initiates the key update, but this is only an example as the Responder could just as well trigger the key update. At 420, the Initiator sends an update message. The update message includes a fresh commit_secret for the next epoch and a new key package containing a fresh encryption key and (optionally) a new credential and signature key. The update message is subject to a message authentication code (MAC) computation using the previous confirm_transcript_hash as context, signed with the Initiator's signature key(skI) and encrypted with the peer's encryption key, in this case the Responder's encryption key(ekR), using the same pattern as the aforementioned Welcome message:

```
struct {
  opaque commit_secret<V>;
  opaque session_id<V>;
  uint32 epoch;
  2MlsSenderKeyPackage new_key_package;
} 2MlsUpdateTBM;
struct {
  2MlsUpdateTBM update_tbm;
  /* MAC(update_key, update_transcript_hash_tbm) */ Mac
  update_tag;
} 2MlsUpdateTBS;
struct {
  2MlsUpdateTBS update_tbs;
  /* SignWithLabel(signing_key, "2MlsUpdate", 2MlsUpdateTBS) */
  optional<opaque> signature<V>
} 2MlsUpdateTBE;
```

If the new_key_package does not contain a new signature key, then the signature field in update_tbs is left empty.

At step 422, the Responder re-runs the key schedule to derive new keys for the new epoch, N+1, using the previous init_secret, the new commit_secret, and using the update_transcript_hash_tbm as the new GroupContext. This yields a new exporter_secret that is used to derive the update_key:

```
update_transcript_hash_tbm = Hash(previous_confirm_transcript_hash ||
2MlsUpdateTBM)
update_key = DeriveSecret(exporter_secret, "2MlsUpdate")
update_tag = Mac(update_key, update_transcript_hash_tbm)
```

After sending the update, the transcript hash becomes:

```
update_transcript_hash = Hash(previous_confirm_transcript_hash ||
2MlsUpdate)
```

Upon receiving the update message, the peer, in this case the Responder, responds, at step 430, with a confirmation message that includes the confirmation tag computing using the key derivation:

```
confirmation_key = DeriveSecret(exporter_secret,
"2MlsUpdateConfirm")
confirmation_tag = Mac(confirmation_key, update_transcript_hash)
```

Then the confirm_transcript_hash is updated:

```
confirm_transcript_hash = Hash(previous_confirm transcript_hash ||
2MlsUpdate || 2MlsConfirm)
```

At step 432, the Initiator can now derive the transport keys rtk(N+1) and itk (N+1) for the new epoch (epoch N+1) using the exporter_secret and the new confirm_transcript_hash.

Like an update in MLS (RFC 9420), this update allows updating the entire leaf node.

After receiving and checking the update confirmation message from the other party, the updating party needs to switch to the new epoch and transport keys. Until the confirmation message is processed, the old keys are being used.

At 440, the Initiator and Responder can now send application traffic encrypted with the new transport keys, itk (N+1) and rtk(N+1), respectively.

In the event that both sides send an update message, each side will recognize the conflict and refuse to send a confirmation message. After a period of time, each side will notice that it has not received a confirmation message from the other side and retry the update.

Accordingly, 2MLS may be considered a general technology for establishing 1:1 secure channels between two endpoints, but the 2MLS technology may have some limitations. For example, 2MLS itself provides authentication only at the level of cryptographic keys. The use of quantum-safe algorithms is expensive, and 2MLS may not natively incorporate quantum cryptography.

At the same time, users of 2MLS can often communicate via other secure channels that may have worse engineering properties than 2MLS but may have better security properties. For example, a channel based on users exchanging information (manually, based on communications between user devices, etc.) is very low bandwidth but can be strongly authenticated. In another example, a quantum key distribution (QKD) channel is similarly low bandwidth but provides confidentiality properties grounded in physical guarantees.

Thus, it may be advantageous to "connect" a 2MLS channel with another OOB mechanism, such as an OOB shared secrets channel, external/non-2MLS communications/exchanges, performing a measurement of a physical phenomenon, etc. that may enable the ability for users/endpoints to obtain/store one or more shared secrets via one or more OOB operations in which the one or more shared secrets can be incorporated into the cryptographic state of a 2MLS channel. Thus, users/endpoints can utilize the good engineering properties of the 2MLS channel in conjunction with the stronger security properties that may be provided via other (communication) mechanisms. Each corresponding shared secret provided/obtained for/by each endpoint can include a corresponding shared secret value and an identifier that uniquely identifies each corresponding shared secret.

Different mechanisms/operations are described herein for providing one or more shared secrets to be stored by endpoints such at least one particular shared secret of the one or more shared secrets can be incorporated into the cryptographic state of the 2MLS channel. The operations for providing the one or more shared secrets can broadly be characterized as 'OOB operations' in that the operations are OOB/external to operations that can be performed between the endpoints for establishing/updating the 2MLS channel through which communications between the endpoints can be exchanged.

In at least one embodiment, the OOB operations can include establishing a secondary channel, such as an OOB shared secrets channel, having different security properties than those that 2MLS provides, through which each of the endpoints can obtain one or more shared secrets. In at least one embodiment, the secondary channel may be a QKD channel through which each of the endpoints can obtain one or more shared secrets.

In at least one embodiment, providing one or more shared secrets to be stored by the endpoints may include OOB operations through which the endpoints exchange one or more wireless communications that facilitate communicating the shared secrets to/between the endpoints and/or communicating keys (e.g., Diffie-Hellman public keys) between the first and second endpoints and deriving a shared secret value from the two key pairs.

In at least one embodiment, providing the one or more shared secrets to be stored by the endpoints may include OOB operations such as generating a QR code by one of the endpoints in which the QR code includes the one or more shared secrets (e.g., generated by the endpoint, generated by a 2MLS app configured for the endpoint, etc.). The QR code can be captured by the other of the endpoints and decoded in order to obtain/store the one or more shared secrets.

In at least one embodiment, providing the one or more shared secrets can include OOB operations such as a user of a first endpoint manually creating a particular shared secret and a user of a second endpoint viewing the particular shared secret via the first endpoint or being told the particular shared secret and manually providing the particular shared secret for the second endpoint. Thus, some OOB operations may include direct interaction between human users of a 2MLS channel (e.g., face-to-face, over a telephone line, etc.) plus a suitable user interface for the users to read out or enter the data sent/communicated between the users, potentially via an OOB channel.

In at least one embodiment, providing the one or more shared secrets can include OOB operations such as performing a measurement of a physical phenomenon observed by at least one of a first endpoint and a second endpoint in which the value measured can be used to provide/create a shared secret. One or both of the endpoints may exchange their shared secret with the other endpoint using any of mechanisms as discussed for embodiments herein.

In at least one embodiment, providing the one or more shared secrets may include OOB operations such as manually providing endpoints with a pool of shared secret bytes (e.g., via a file that can be downloaded/installed on devices). In such embodiments, at least one shared secret value that is to be incorporated into the cryptographic state of a 2MLS channel can be identified by identifying (between the endpoints) at least one range of byes from the pool that are define the shared secret value(s).

In accordance with embodiments herein, two endpoints can establish a 2MLS channel over which the 2MLS protocol is executed. At least one particular shared secret provided to/stored by the endpoints can be determined by the endpoints for incorporation into the 2MLS channel by providing an identifier of the particular shared secret from one of the endpoints to the other of the endpoints via at least one of a one-to-one secure channel handshake or a key update process, as discussed in further detail herein, below, with reference to FIGS. 10 and 11.

In various embodiments, an identifier for a shared secret may include any combination of:

- An identifier of an OOB device and/or an OOB shared secrets channel through which the shared secret is obtained;
- A starting byte position and an ending byte position for a stream of shared secret bytes obtained via an OOB shared secrets channel that identifies the shared secret value for the shared secret;
- An identifying value that is derived from the shared secret, for example, via a hash function/KDF, that uniquely identifies the shared secret;
- An index number of the shared secret(e.g., (1), (2), (3), and so on, for instances in which multiple shared secrets/a list of shared secrets may be provided/stored by endpoints);
- One or more attributes that may be associated with any combination of:
  - Temporal information (day, time of day, etc.) and/or geographic information (e.g., latitude/longitude, Global Positioning System (GPS) coordinates, etc.) associated with OOB communications (wireless communications, generating/capturing a QR code, etc.) involved in communicating/exchanging the shared secret between endpoints (e.g., a time and/or location at which the wireless communications occurred);
  - Temporal and/or geographic information associated with a measurement of a physical phenomenon observed by at least one endpoint in which a value of the measurement is used for the shared secret/deriving the shared secret value; and/or
  - User identifiers for users associated with endpoints.

Figure 5:
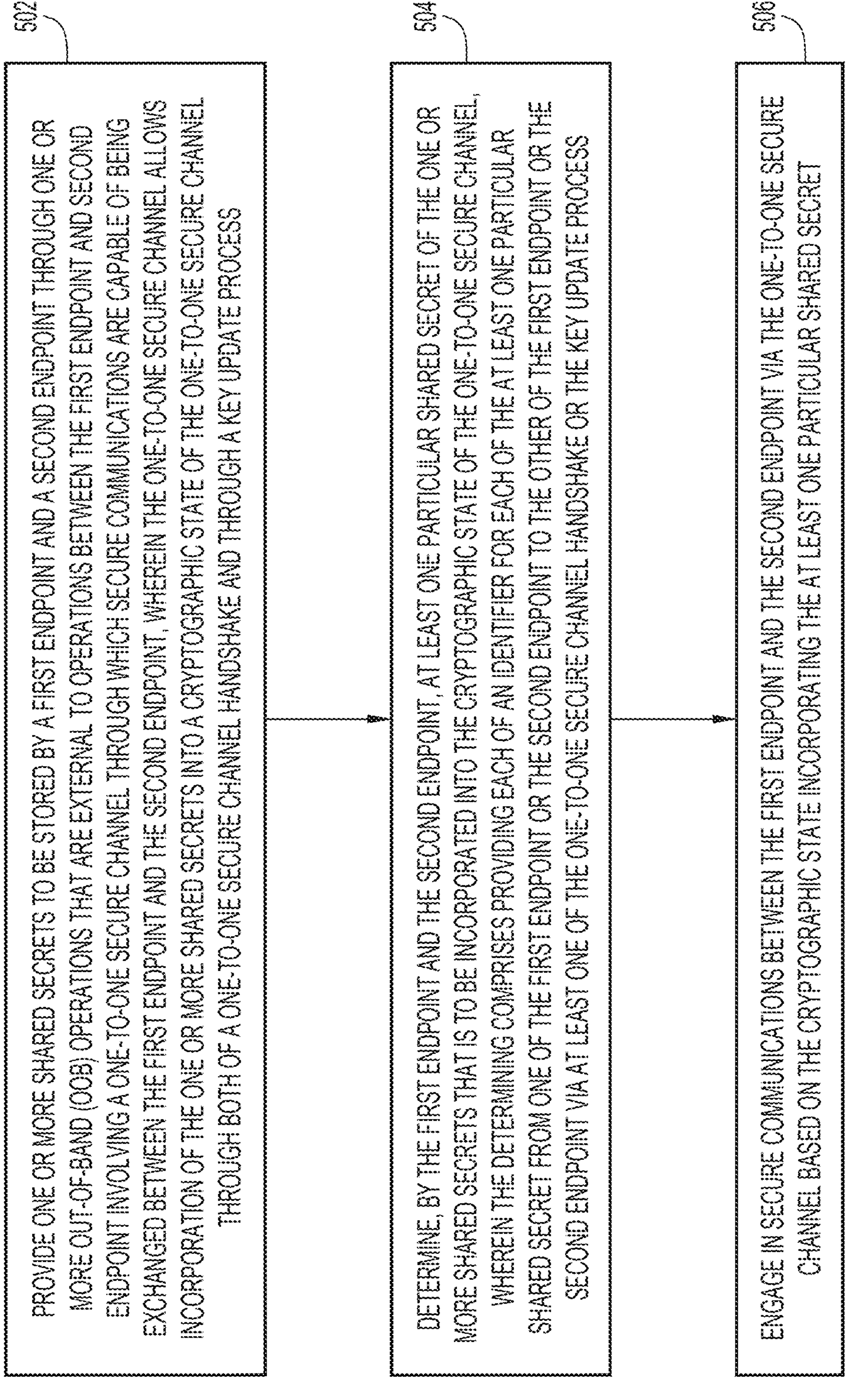
FIG. 5 is a flow chart depicting, at a high-level, a method involving operations performed between two parties (a first endpoint and a second endpoint) for incorporating at least one shared secret into a cryptographic state of a one-to-one secure channel through which the two parties can communicate, according to an example embodiment.

Referring to FIG. 5, FIG. 5 is a flow chart depicting, at a high-level, a method 500 involving operations performed between a first endpoint and a second endpoint for incorporating at least one shared secret, provided/stored by the endpoints, into a cryptographic state of a one-to-one secure channel (e.g., a 2MLS channel) through which the two parties can communicate, according to an example embodiment.

As shown at 502, the method may include providing one or more shared secrets to be stored by a first endpoint and a second endpoint through one or more out-of-band (OOB) operations that are external to operations between the first endpoint and second endpoint involving a one-to-one secure channel through which secure communications are capable of being exchanged between the first endpoint and the second endpoint, wherein the one-to-one secure channel allows incorporation of the one or more shared secrets into a cryptographic state of the one-to-one secure channel through both of a one-to-one secure channel handshake and through a key update process. Each shared secret of the one or more shared secrets may include a shared secret value (potentially the shared secret as provided to each endpoint or derived therefrom) and an identifier in which the identifier uniquely each shared secret(referred to herein as a shared secret ID). In at least one embodiment, each shared secret may be a PSK having a corresponding PSK value and a PSK ID.

Various techniques through which at least one shared secret can be provided for a pair of endpoints utilizing one or more OOB operations (OOB/external to 2MLS communications/operations) are discussed below with reference to FIGS. 6A, 6B, 7A, 7B, 8, 9A, and 9B.

Moving to 504 of FIG. 5, the method may include determining, by the first endpoint and the second endpoint, at least one particular shared secret of the one or more shared secrets that is to be incorporated into the cryptographic state of the one-to-one secure channel, wherein the determining comprises providing each of an identifier for each of the at least one particular shared secret from one of the first endpoint or the second endpoint to the other of the first endpoint or the second endpoint via at least one of the one-to-one secure channel handshake or the key update process.

In one instance, the determining at 504 may involve performing the one-to-one secure channel handshake that can include each identifier for each of the at least one particular shared secret being communicated between the first and second endpoints. Features of such a one-to-one secure handshake through which at least one particular shared secret can be determined for incorporation into the cryptographic state of a one-to-one secure channel are discussed below with reference to FIG. 10.

In another instance, the determining at 504 may involve performing the key update process that can include each identifier for each of the at least one particular shared secret being communicated between the first and second endpoints. Features of such a key update process through which at least one particular shared secret can be determined for incorporation into the cryptographic state of a one-to-one secure channel are discussed below with reference to FIG. 11.

At 506, the method may include engaging in secure communications between the first endpoint and the second endpoint via the one-to-one secure channel based on the cryptographic state incorporating the at least one particular shared secret.

Figure 6A:
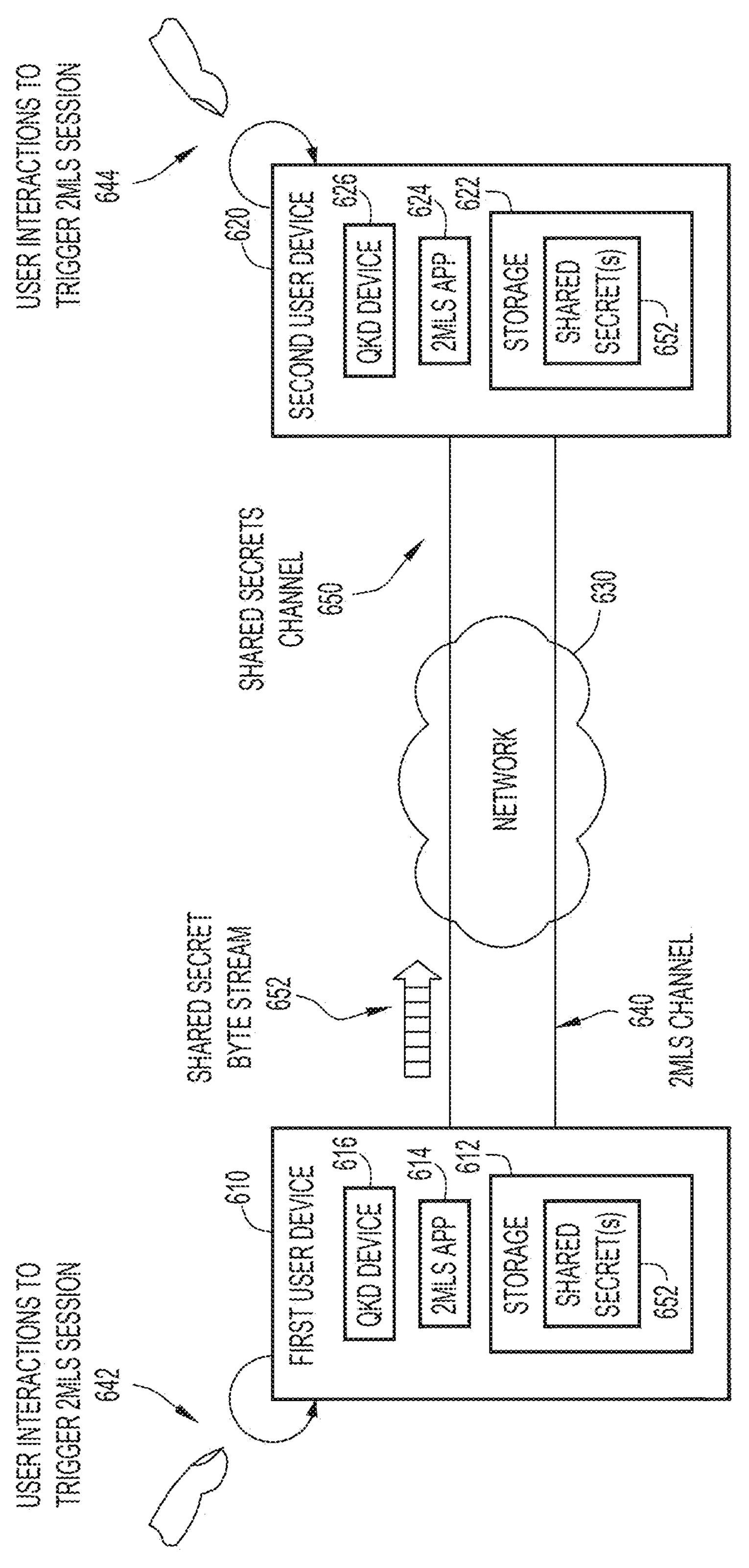
FIG. 6A is a block diagram of a system illustrating example details associated with establishing at least one shared secrets channel through which one or more shared secrets can be provided to/stored by two parties that can be incorporated into a cryptographic state of a one-to-one secure channel through which the two parties can communicate, according to an example embodiment.
Figure 6B:
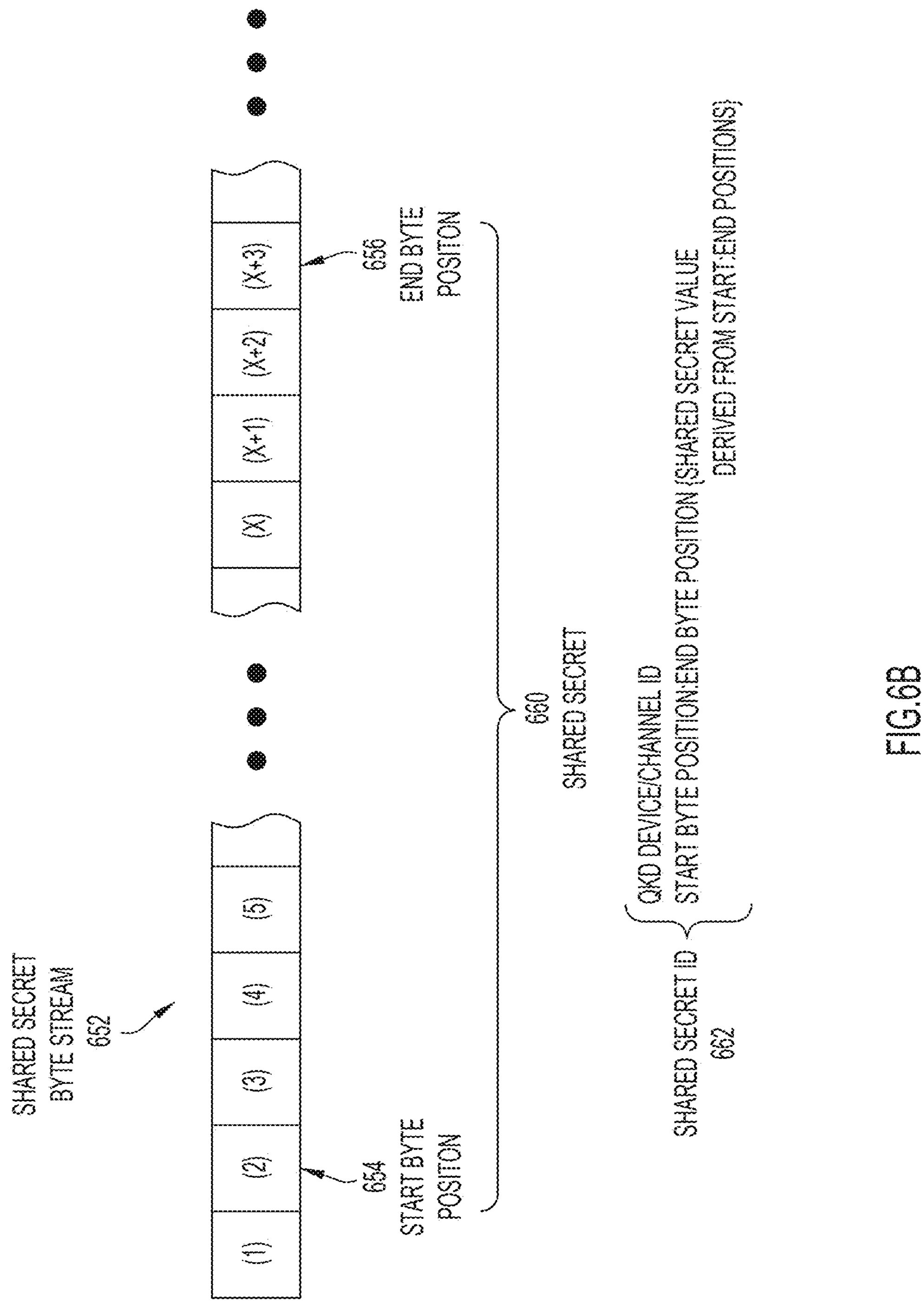
FIG. 6B is a schematic diagram illustrating example details for a shared secret byte stream that can be provided via the at least one shared secrets channel of FIG. 6A to the two parties, according to an example embodiment.

Reference is now made to FIG. 6A. FIG. 6A is a block diagram of a system 600 illustrating example details associated with OOB operations for establishing at least one shared secrets channel which one or more shared secrets can be provided to/stored by two parties in which a particular shared secret of the one or more shared secrets can be incorporated into a cryptographic state of a one-to-one secure (2MLS) channel through which the two parties can communicate, according to an example embodiment. FIG. 6B, discussed with reference to FIG. 6A, is a schematic diagram illustrating example details for a shared secret byte stream that can be provided via the at least one shared secrets channel of FIG. 6A to the two parties, according to an example embodiment.

In at least one embodiment, system 600 can include a first user device 610 (a first endpoint) and a second user device 620 (a second endpoint) that can establish a 2MLS channel 640 via a network 630 for exchanging secure communications. The first user device 610 can be configured with storage 612 and the second user device 620 can be configured with storage 622.

Further, each of the first user device 610 and the second user device 620 can be configured with 2MLS logic or an application (app), shown in FIG. 6A as a 2MLS app 614 that can be configured for the first user device 610 and a 2MLS app 624 that can be configured for the second user device 620 in which each 2MLS app can facilitate the establishment of the 2MLS channel 640, for example, for a 2MLS session for exchanging communications between the first user device 610 and the second user device 620.

Additionally, a QKD device 616 can be provided for the first user device 610 and a QKD device 626 can be provided for the second user device 620. Each of the QKD device 616 and QKD device 626 can include any combination of hardware, software, logic, input/output (I/O) interfaces (modulators, transmitters, receivers, etc.), and/or the like to facilitate the generation and communication of quantum keys, referred to herein as shared secret bytes, using any techniques now known or hereafter developed as would be understood by a person of ordinary skill in the art of QKD. In various embodiments, the QKD device 616 can be integrated with or external to the first user device 610 and the QKD device 626 can be integrated with or external to the second user device 620.

In one instance, for example, a user of the first user device 610 can trigger the 2MLS session for establishing the 2MLS channel 640 with second user device 620 via user interactions 642 involving the 2MLS app 614 (e.g., via a user interface (UI) (not shown) of the first user device 610). A user of the second user device 620 can also perform user interactions 644 involving the 2MLS app 624 for establishing the 2MLS channel 640. The user interactions 642 and/or 644 may be characterized as any techniques that can be used for initiating/triggering communications between two devices, for example, by opening or signing into an application, selecting a contact from a contacts list and sending the selected contact a message, typing a phone number/email address, etc. and may involve any combination of one or both of user interactions 642 and/or 644.

In one instance, the user interactions 642/644 can trigger at least one (OOB) shared secrets channel 650 to be established between the first user device 610 and the second user device 620, for example, between the QKD device 616 and the QKD device 620. In at least one embodiment, shared secrets channel 650 can be established via optical communications that can be facilitated via a fiber optic cable and/or free space (over-the-air).

In one example, user interactions 642 and/or 644 via the first and second user devices 610 and 620, such as signing into each MLS app 614 and 624, initiating a 'create secret' function within the app, and/or the like can trigger establishment of shared secrets channel 650. At least one of the QKD devices 616/626 can generate a shared secret byte stream, for example, based on user interactions with at least one of the first user device 610 and/or the second user device 620. For instance, in one example during operation of system 600, the QKD device 616 of the first user device 610 can generate a shared secret byte stream 652 that is communicated to the QKD device 626 of the second user device 620.

In some embodiments, the shared secrets channel 650 can be established using TLS protocol, MLS protocol, or the like. In some embodiments, the shared secrets channel 650 can be routed over network 630 and/or a quantum network. Although only one QKD device is shown for each of the first user device 610 and the second user device 620, in some embodiments, multiple QKD devices can be provided for the user devices 610/620. In some embodiments, multiple shared secrets channels can be established for the first user device 610 and the second user device 620.

The shared secrets byte stream 652 may include a number of bytes and may be considered a quantum key/keys in which the shared secrets byte stream 652 as generated (in this example) by the QKD device 616 of the first user device 610 can be stored via storage 612 and as obtained by the second user device 620, via shared secrets channel 650, can be stored via storage 622. In various embodiments, the shared secret byte stream 652 may be generated continuously, periodically upon establishment of a given shared secrets channel, when triggered by a 2MLS app, or any combination thereof.

With reference to FIG. 6B, FIG. 6B is a schematic diagram illustrating example details for the shared secret byte stream 652 of FIG. 6A that can be provided via the shared secrets channel 650 and from which at least one shared secret can be obtained, according to an example embodiment.

For example, a shared secret 660 to be incorporated into a cryptographic state of the 2MLS channel 640 can be determined via a shared secret ID 662 (e.g., a PSK ID) that includes various attributes that can be used to identify the shared secret 660. The attributes of the shared secret ID 662 may include an identification of the QKD device and/or channel from which the corresponding shared secret byte stream 652 was provided/obtained. The attributes of the shared secret ID 662 may also include a start byte position 654 (e.g., byte 2 in FIG. 6B) and an end byte position 656 (e.g., byte X+3 in FIG. 6B) of the shared secret byte stream 652 from which the shared secret value of the shared secret 660 can be derived. In at least one embodiment, one of the 2MLS apps 614 or 624 may randomly generate the start and end byte positions for the shared secret 660. In at least one embodiment, one of the 2MLS apps 614 or 624 can identify a range of bytes or a size of the share secret value (e.g., 64 bytes) from which each of one or more shared secret values are to be determined in which each 2MLS app 614/624 can select consecutive 'chunks' of bytes from the shared secret byte stream 652 for each shared secret value (e.g., bytes 0-63 for a first shared secret value, bytes 64-127 for a second shared secret value, and so on).

In some scenarios, any individual shared secret byte stream and any individual shared secret/PSK derived therefrom may be used to further derive multiple PSKs injected into different 2MLS connections/channels, or into the same 2MLS connection/channel over time.

As discussed in further detail herein below, for example, with reference to FIGS. 10 and 11, use of a shared secret derived from a shared secret byte stream obtained from a QKD service can be incorporated into the cryptographic state of a 2MLS channel via a one-to-one secure handshake and/or key update process using at least one corresponding shared secret ID that identifies at least one corresponding shared secret of the shared secret byte stream provided for two endpoints/parties. Thus, as shown with reference to FIGS. 6A and 6B, at least one OOB secure channel can be established for two endpoints (potentially via TLS connections) through which quantum keys (e.g., shared secret byte streams) can be distributed. Thus, quantum secure cryptography can be used to create a shared secret(e.g., a PSK) for a 2MLS connection, endowing the 2MLS connection with a degree of quantum-safety regardless of the cryptographic algorithms that the 2MLS connection utilizes.

Figure 7A:
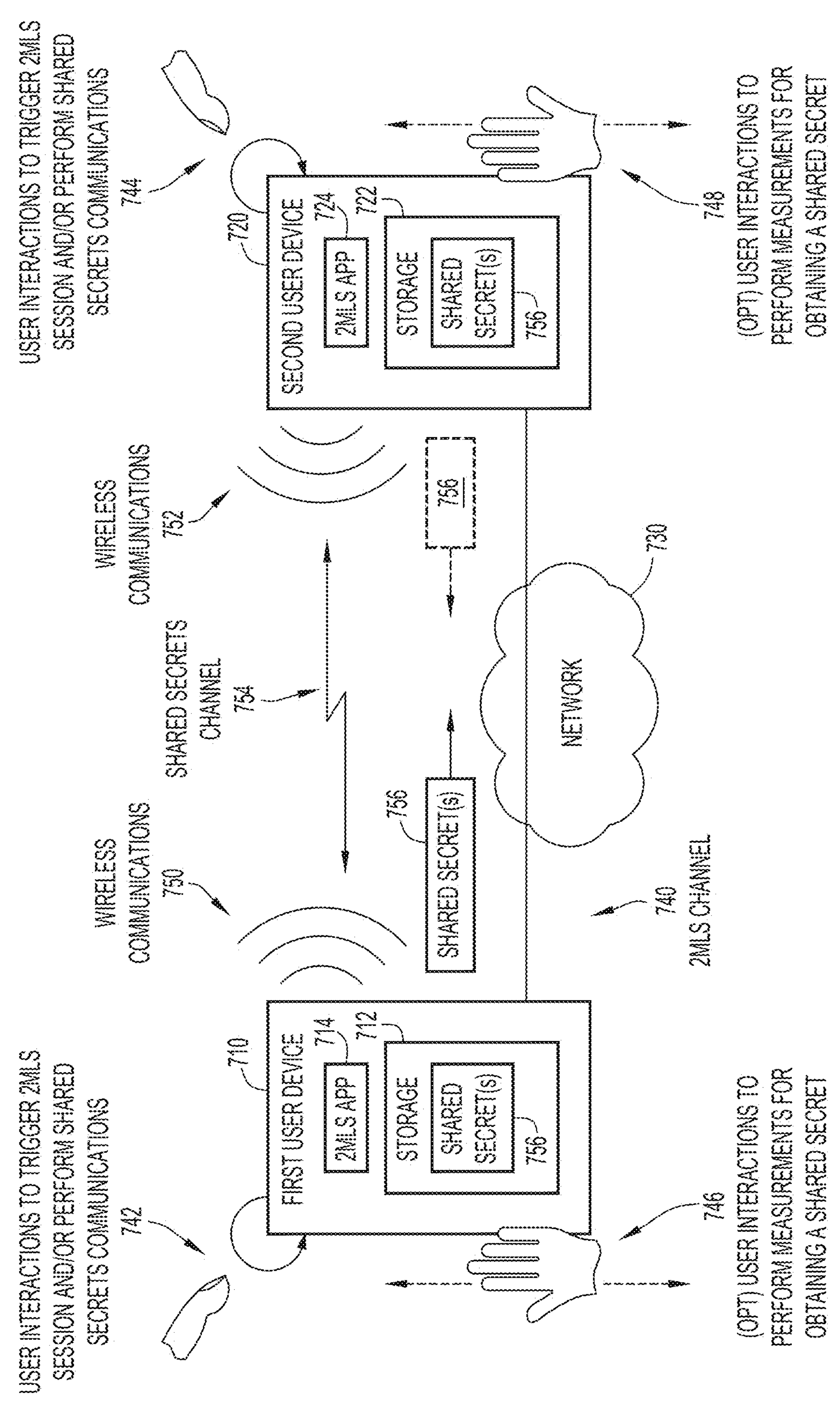
FIG. 7A is a block diagram of a system illustrating example details associated with providing, via one or more wireless communications, one or more shared secrets that can be incorporated into a cryptographic state of a one-to-one secure channel through which the two parties can communicate, according to an example embodiment.
Figure 7B:
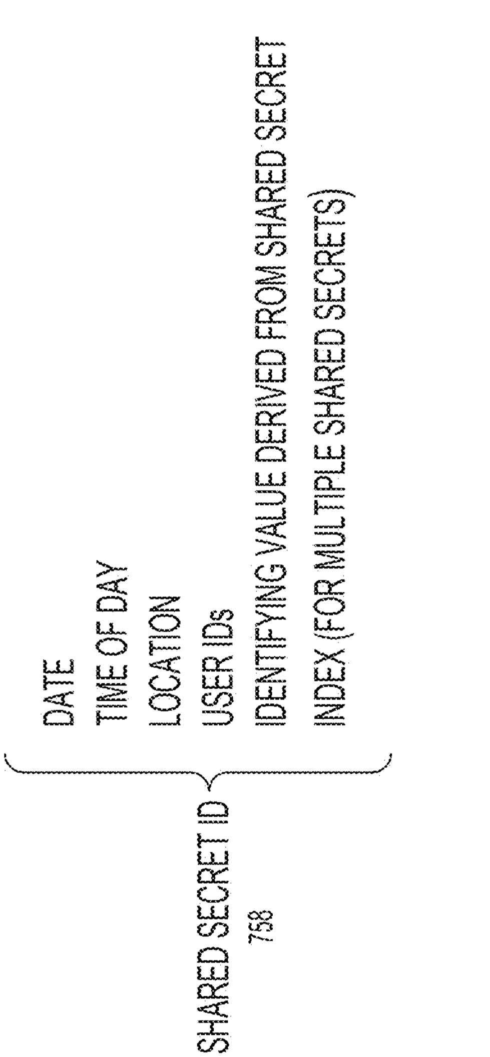
FIG. 7B is a schematic diagram illustrating example attributes that can be used to identify one or more shared secrets associated with the wireless communications of FIG. 7A, according to an example embodiment.

With reference to FIG. 7A, FIG. 7A is a block diagram of another system 700 illustrating example details associated with OOB operations that can include providing, via one or more wireless communications between two parties, one or more shared secrets that can be incorporated into a cryptographic state of a one-to-one secure (2MLS) channel through which the two parties can communicate, according to an example embodiment. FIG. 7B is a schematic diagram illustrating example attributes that can be used to identify one or more shared secrets associated with the wireless communications of FIG. 7A, according to an example embodiment.

In at least one embodiment, system 700 can include a first user device 710 (a first endpoint) and a second user device 720 (a second endpoint) that can establish a 2MLS channel 740 via a network 730 for exchanging secure communications via the 2MLS channel 740. The first user device 710 can be configured with storage 712 and a 2MLS app 714 and the second user device 720 can be configured with storage 722 and a 2MLS app 724.

In one instance, a user of the first user device 710 can trigger the 2MLS session for establishing the 2MLS channel 740 with second user device 720 via user interactions 742 involving the 2MLS app 714 (e.g., via a UI (not shown) of the first user device 710). A user of the second user device 720 can also perform user interactions 744 involving the 2MLS app 724 for establishing the 2MLS channel 740. The user interactions 742 and/or 744 may be characterized as any techniques for initiating/triggering communications between two devices, for example, by opening or signing into an application, selecting a contact from a contacts list and sending the selected contact a message and may involve any combination of one or both of user interactions 742 and/or 744.

In one example, respective user interactions 742 and/or 744 performed via the respective first user device 710 and/or the second user device 720, such as opening each MLS app 714 and 724, etc. can trigger wireless communications between the user devices, shown in FIG. 7A as wireless communications 750 for first user device 710 and wireless communications 752 for second user device 720 in which the wireless communications may facilitate a shared secrets channel 754 through which one or more shared secrets and corresponding identifiers thereof can be exchanged between the user devices.

In one embodiment, for example, user interactions 742 may trigger 2MLS app 714 to generate the one or more shared secrets 756 (which can be stored in storage 712) and to wirelessly transmit the shared secret(s) 756 to second user device 720, which can receive and store the shared secret(s) 756 via storage 722. An identifier for each of the shared secret(s) 756 (shared secret ID(s) can be included in the communications. In some instances, the second user device 720/2MLS app 724 could also generate one or more shared secrets/IDs for transmission to the first user device 710. In some instances, user devices may wirelessly transmit an acknowledgement indicating receipt of one or more shared secrets.

In another embodiment, user interactions 742 may involve the user of the first user device 710 manually generating/creating the one or more shared secrets 756 for transmission to the second user device 720.

In another embodiment, the one or more shared secrets 756 can be created by generating and passing two Diffie-Hellman public keys between the first user device 710 and the second user device 720 and deriving a shared secret value from the two key pairs. Other variations for generating/obtaining/providing the one or more shared secrets 756 can be envisioned.

The wireless communications 750/752 may utilize any communication protocol, such as any wireless communication protocol, including, but not limited to, a near-field communication (NFC) protocol, a Bluetooth® communication protocol, an Ultra-Wideband (UWB) communication protocol, an ultrasound communication protocol, an Infrared (IR) communication protocol, and/or the like.

In some embodiments, respective user interactions with the respective first user device 710 and the second user device 720 can trigger the devices to perform a measurement of a physical phenomenon observable by at least one of the user devices in which a value of the measurement may constitute a shared secret provided for each of the devices. In at least one embodiment, the physical phenomenon that may be measured may be physically "shaking" at least one user device to trigger a measurement of the shaking action by an accelerometer of at least one of the user devices in which the value of the measurement can be used as a shared secret.

For example, the user of the first user device 710 may optionally perform user interactions 746 that involve shaking the first user device 710 to trigger an accelerometer of the device to perform a measurement of the shaking action in which a value of the measurement can be used as a shared secret that can be communicated to the second user device via wireless communications 750. In another example, the user of the second user device 710 may optionally perform user interactions 748 that involve shaking the second user device 720 to trigger an accelerometer of the device to perform a measurement of the shaking action in which a value of the measurement can be used as a shared secret that can be communicated to the second user device via wireless communications 752.

In yet another example, the respective users of both of the first user device 710 and the second user device 720 can shake their corresponding devices to trigger a measurement of the shaking. In this example, each of the first user device 710 and the second user device 720 can exchange shared secrets, such as Diffie-Helman keys public keys, via wireless communications 750/752 in which a shared secret value can be derived by each of the first user device 710 and the second user device 720 from the two key pairs.

Each of the corresponding one or more shared secrets 756 provided via the shared secrets channel 754 can include and be stored with a corresponding shared secret ID 758 (as shown in FIG. 7B) that can be used to uniquely identify each shared secret obtained/provided via the wireless communications.

With reference to FIG. 7B, FIG. 7B is a schematic diagram illustrating example details for a shared secret ID 758 (e.g., a PSK ID) that can be used to identify each of a corresponding shared secret(e.g., PSK) communicated/obtained via the shared secrets channel 754.

In various embodiments, the shared secret ID 758 can include one or more attributes that can uniquely identify a corresponding shared secret, such as temporal information, including, but not limited to, a date, time of day, etc. associated with the wireless communications and/or the measurements of physical phenomena through which the one or more shared secrets 756 were provided, location information (e.g., latitude/longitude, GPS coordinates, etc.) associated with the location at which the wireless communications and/or the measurements of physical phenomena through which the one or more shared secrets 756 were provided, a user identifier identifying the user/user device from which the one or more shared secrets 756 were obtained, a value identifying the shared secret that can be derived from the shared secret using a hash function or KDF, and/or an index indication (for instances in which multiple shared secrets are provided for the user devices).

Broadly, attributes associated with the wireless communications between the first user device 710 and the second user devices 720 may be characterized as attributes identifying the shared secrets channel 754 through which the one or more shared secrets 756 are communicated. For instances in which multiple shared secrets 756 are communicated, the attributes identifying the shared secrets channel 754 can be combined with index indication attributes to uniquely identify each of the multiple shared secrets.

Figure 8:
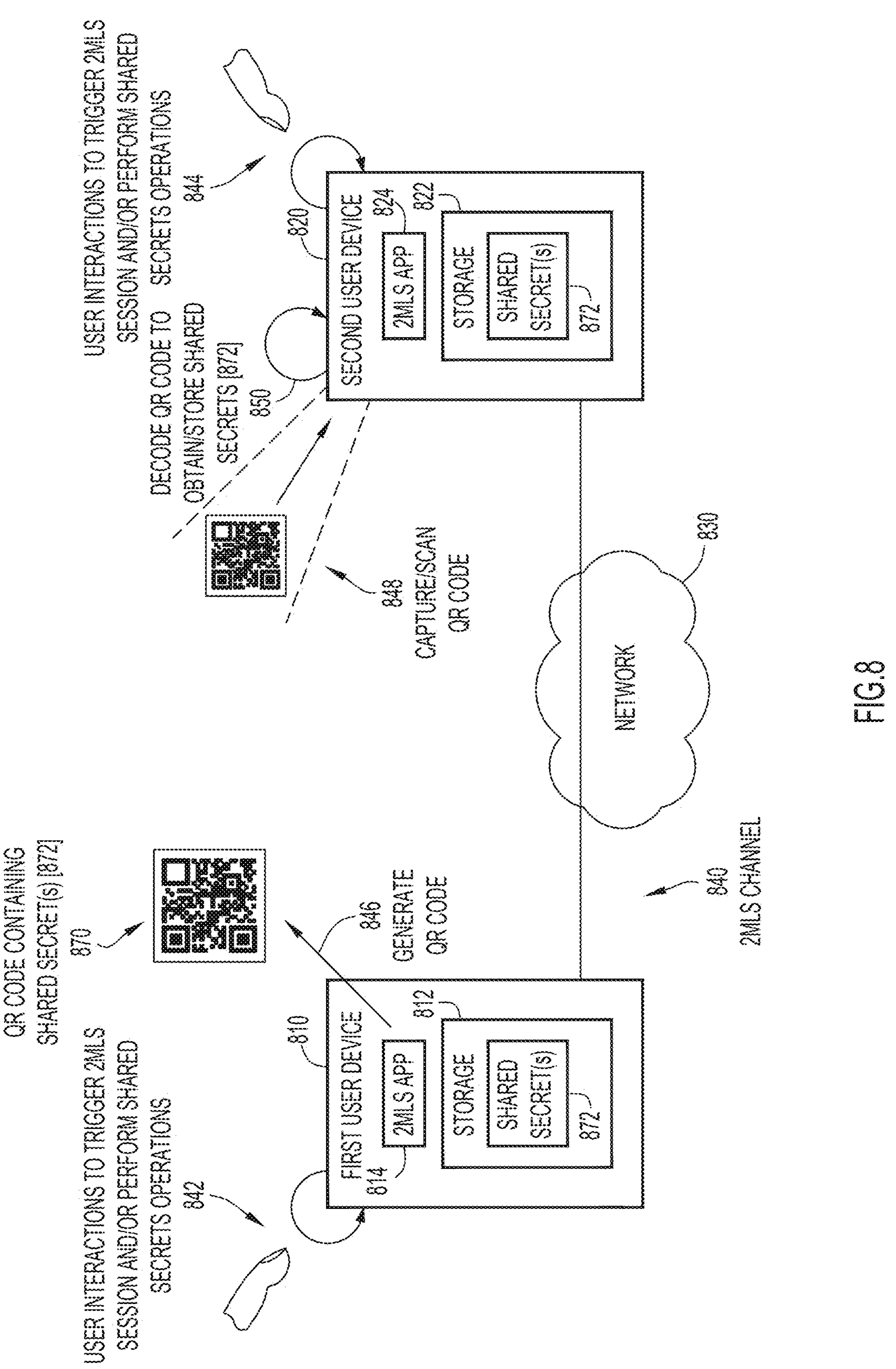
FIG. 8 is a block diagram of another system illustrating other example details associated with providing, via a quick-response (QR) code process, one or more shared secrets that can be incorporated into a cryptographic state of a one-to-one secure channel through which the two parties can communicate, according to an example embodiment.

With reference to FIG. 8, FIG. 8 is a block diagram of another system 800 illustrating other example details associated with OOB operations including providing, via a QR code process, one or more shared secrets that can be incorporated into a cryptographic state of a one-to-one secure (2MLS) channel through which the two parties can communicate, according to an example embodiment.

In at least one embodiment, system 800 can include a first user device 810 (a first endpoint) and a second user device 820 (a second endpoint) that can establish a 2MLS channel 840 via a network 830 for exchanging secure communications. The first user device 810 can be configured with storage 812 and a 2MLS app 814 and the second user device 720 can be configured with storage 822 and a 2MLS app 824.

In one instance, a user of the first user device 810 can trigger the 2MLS session for establishing the 2MLS channel 840 with second user device 820 via user interactions 842 involving the 2MLS app 814 (e.g., via a UI (not shown) of the first user device 810). A user of the second user device 820 can also perform user interactions 844 involving the 2MLS app 824 for establishing the 2MLS channel 840. The user interactions 842 and/or 844 may be characterized as any techniques for initiating/triggering communications between two devices, for example, by opening or signing into an application, selecting a contact from a contacts list and sending the selected contact a message and may involve any combination of one or both of user interactions 842 and/or 844.

In one example, user interactions 842 may involve the user of the first user device 810 causing a QR code 870 containing one or more shared secrets 872 embedded therein to be generated, as generally shown at 846, and displayed via a display (not shown) of the first user device 810. In at least one embodiment, the user interactions 842 may involve triggering the QR code generation via the 2MLS app 814, in which the 2MLS app 814 can generate the one or more shared secrets 872, cause the shared secrets 872 to be stored via storage 822, and cause the QR code to be displayed via the display of the first user device 810.

For the present example, user interactions 844 may involve the user of the second user device 820 triggering, via the 2MLS app 824, the second user device 820 to capture or scan the QR code 870, as generally shown at 848, via a camera (not shown) of the user device 820. The captured/scanned QR code 870 can then be decoded, as generally shown at 850, in order to obtain the one or more shared secrets 872 can cause the shared secrets to be stored via storage 822.

Although not shown in FIG. 8, a shared secret ID can be used to identify each of a corresponding shared secret communicated/obtained via a QR code. In various embodiments, the shared secret ID can include one or more attributes that can uniquely identify a corresponding shared secret, such as temporal information and/or geographic information associated with shared secrets provided (generated or captured) via a QR code, a user identifier identifying the user/user device from which the one or more shared secrets were obtained, and/or an index indication (for instances in which multiple shared secrets are provided for the user devices).

In some embodiments, one or more shared secret IDs including one or more attributes can be encoded in a QR code along with one or more corresponding shared secrets encoded within the QR code.

Figure 9A:
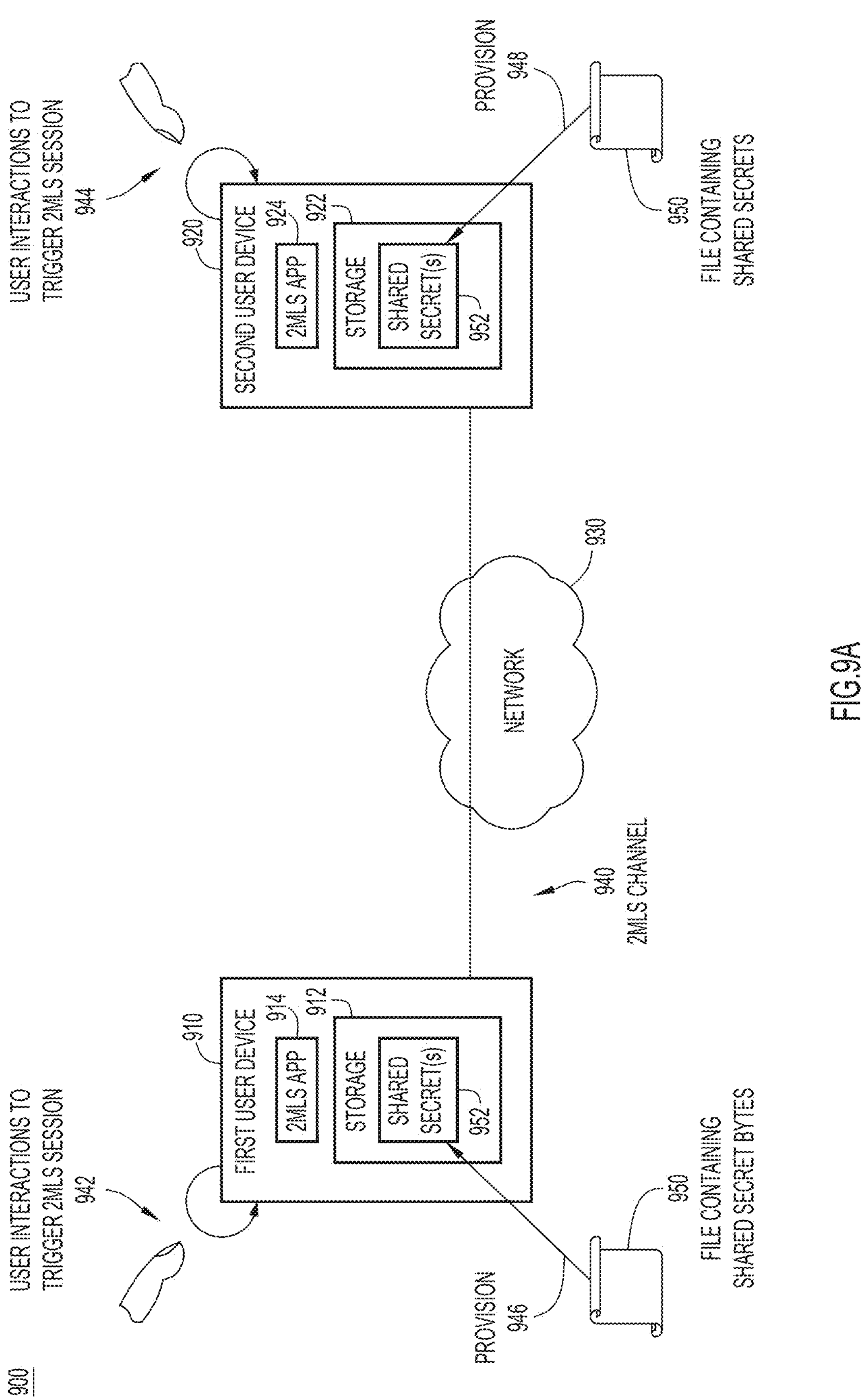
FIG. 9A is a block diagram of another system illustrating other example details associated with providing one or more shared secrets that can be incorporated into a cryptographic state of a one-to-one secure channel through which the two parties can communicate using a pool of shared secret bytes that can be provided for the parties, according to an example embodiment.

With reference to FIG. 9A, FIG. 9A is a block diagram of another system 900 illustrating other example details associated with OOB operations including providing, via a file or other data structure, one or more shared secrets that can be incorporated into a cryptographic state of a one-to-one secure (2MLS) channel through which the two parties can communicate, according to an example embodiment.

In at least one embodiment, system 900 can include a first user device 910 (a first endpoint) and a second user device 920 (a second endpoint) that can establish a 2MLS channel 940 via a network 930 for exchanging secure communications. The first user device 910 can be configured with storage 912 and a 2MLS app 914 and the second user device 920 can be configured with storage 922 and a 2MLS app 924.

In one instance, a user of the first user device 910 can trigger the 2MLS session for establishing the 2MLS channel 940 with second user device 920 via user interactions 942 involving the 2MLS app 914 (e.g., via a UI (not shown) of the first user device 910). A user of the second user device 920 can also perform user interactions 944 involving the 2MLS app 924 for establishing the 2MLS channel 940. The user interactions 942 and/or 944 may be characterized as any techniques for initiating/triggering communications between two devices, for example, by opening or signing into an application, selecting a contact from a contacts list and sending the selected contact a message and may involve any combination of one or both of user interactions 942 and/or 944.

In one example, user interactions 942 may include or more interactions for performing OOB operations that facilitate providing/provisioning (as generally illustrated at 946) a file 950 containing a plurality of shared secret bytes 952 for the first user device 910, which is stored via storage 912. File 950 may be a data structure, object, etc. containing the shared secret bytes and may represent a 'codebook' from which one or more shared secret values can be determined, for example, using starting byte position(s) and ending byte positions of the plurality of bytes to define each of one or more shared secret values.

In one instance, the user of the first user device 910 can cause the first user device 910 to download the file 950 from an external location (e.g., using a predefined Uniform Resource Location (URL) or Uniform Resource Identifier (URI) configured for 2MLS app 914). In another instance, the user of the first user device 910 can manually load the file to the first user device (e.g., via a thumb drive, etc.). Other variations for provisioning the file 950 can be envisioned. The file 950 can also be provisioned (as generally illustrated at 948) for the second user device 920 via user interactions 944, which are stored via storage 922.

Figure 9B:
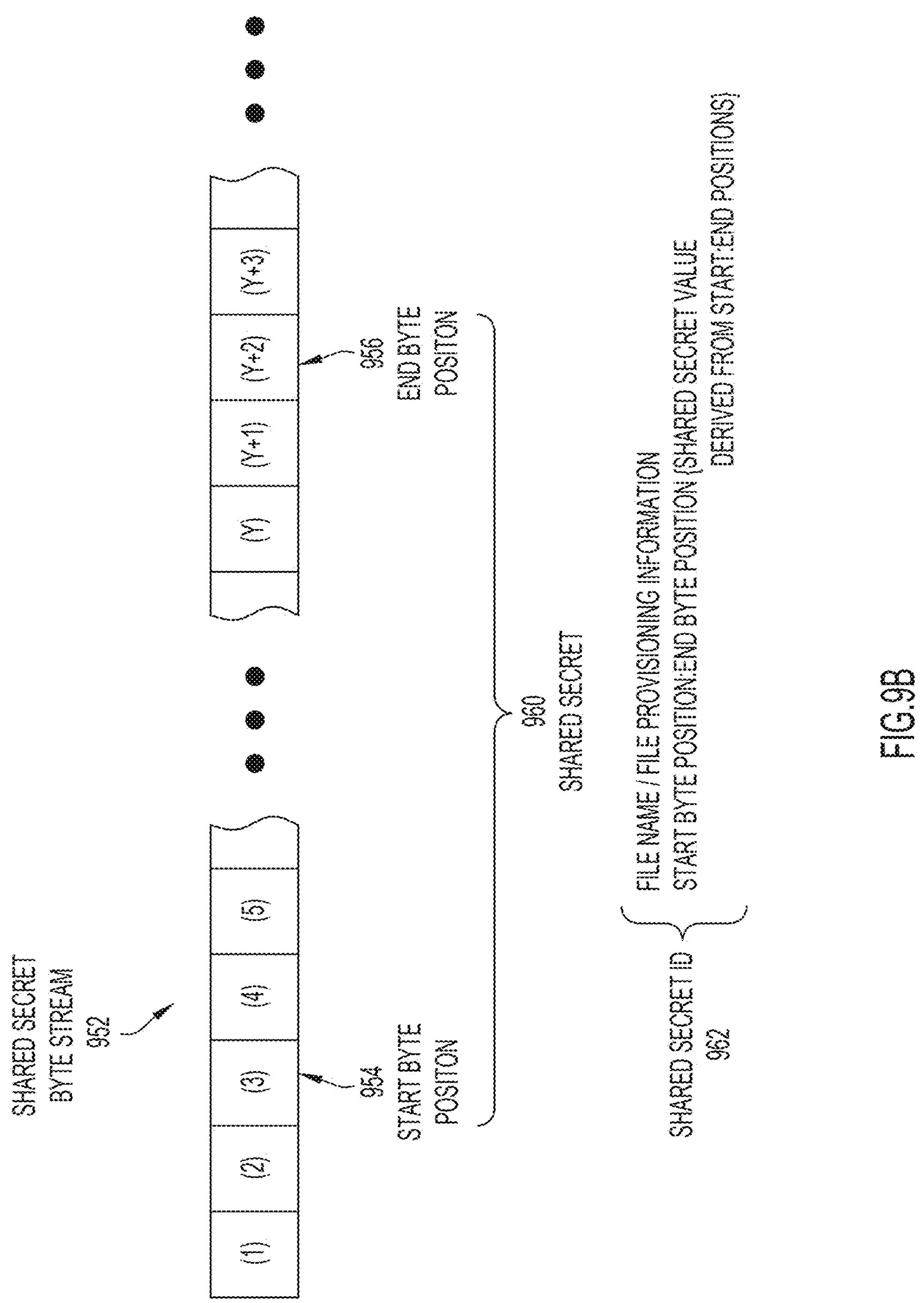
FIG. 9B is a schematic diagram illustrating example details for a shared secret byte stream that can be provided utilizing the system of FIG. 9A to the two parties, according to an example embodiment

With reference to FIG. 9B, FIG. 9B is a schematic diagram illustrating example details for the shared secret bytes 952 that can be provided for the first user device 910 and the second user device 920 for the system 900 of FIG. 9A and from which at least one shared secret can be obtained, according to an example embodiment.

A shared secret 960 to be incorporated into the cryptographic state of the 2MLS channel 940 can be determined via a shared secret ID 962 that includes various attributes that can be used to identify the shared secret 960.

The attributes of the shared secret ID 662 may include a file name or other identifying information associated with the file (950) containing the shared secret bytes 952 and/or the provisioning/storage of the file (e.g., temporal information, location/resource from which the file was obtained, etc.). The attributes of the shared secret ID 962 may also include a start byte position 954 (e.g., byte (3) in FIG. 9B) and an end byte position 956 (e.g., byte (Y+2) of the shared secret bytes 952 from which the shared secret value of the shared secret 960 can be derived.

In at least one embodiment, one of the 2MLS apps 914 or 924 may randomly generate the start and end byte positions for the shared secret 960. In at least one embodiment, one of the 2MLS apps 914 or 924 can identify a range of bytes or a size of the share secret value (e.g., 64 bytes) from which each of one or more shared secret values are to be determined in which each 2MLS app 914/924 can select consecutive 'chunks' of bytes from the shared secret bytes 952 for each shared secret value (e.g., bytes 0-63 for a first shared secret value, bytes 64-127 for a second shared secret value, and so on).

Accordingly, as illustrated through FIGS., 6A, 7A, 8, and 9A one or more shared secrets can be provided/stored by endpoints using a variety of mechanisms in accordance with embodiments herein. The endpoints can determine a particular shared secret that is to be incorporated into the cryptographic state of a 2MLS channel by providing an identifier of the particular shared secret(a particular shared secret ID) from one of the endpoints to the other of the endpoints via at least one of a one-to-one secure channel handshake or a key update process.

The particular shared secret identified by the particular shared secret ID can be retrieved from storage of each of the devices and incorporated into the cryptographic state of the 2MLS channel.

Figure 10:
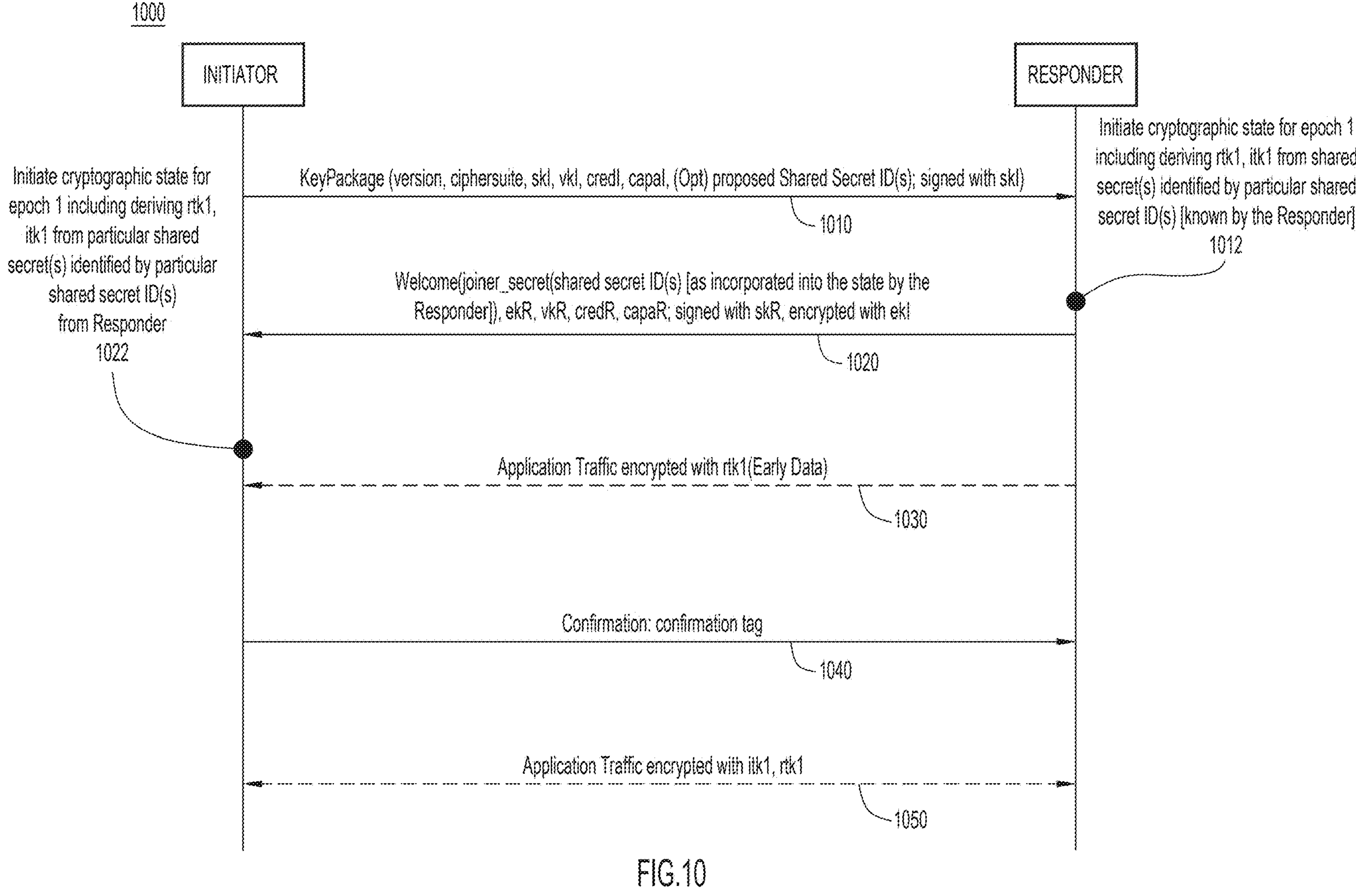
FIG. 10 is a sequence diagram depicting example operations for determining, between two parties (an Initiator and a Responder), at least one particular shared secret to be incorporated into a cryptographic state of a one-to-one secure channel via a one-to-one secure channel handshake, according to an example embodiment.

With reference to FIG. 10, FIG. 10 is a sequence diagram depicting example operations for determining, between two parties (an Initiator and a Responder), at least one particular shared secret to be incorporated into a cryptographic state of a one-to-one secure (2MLS) channel via a one-to-one secure (2MLS) channel handshake 1000 to establish the one-to-one secure (2MLS) channel, according to an example embodiment.

Generally, the operations as discussed for the one-to-one secure handshake 1000 can be performed in a similar to the operations as discussed above for FIG. 3A involving the one-to-one secure handshake 300, with enhancements for identifying at least one particular shared secret (via shared secret ID) for incorporation into the cryptographic state of the one-to-one secure (2MLS) channel.

As shown at step 1010, the Initiator sends to the Responder a KeyPackage message containing the Initiator's key package, referred to above as KeyPackageI in FIG. 2A. Alternatively, the Responder downloads the Initiator's key package from a key server.

In at least one embodiment, the Initiator may also include one or more proposed shared secret IDs in the KeyPackage message for or more shared secrets known/stored by the Initiator that could be used by the Initiator for incorporation into the cryptographic state of the 2MLS channel. Per RFC 9420, multiple shared secrets or PSKs can be incorporated into the cryptographic state using multiple chained sequences of KDFs.

In at least one embodiment, no shared secret ID(s) may be included in the KeyPackage message.

Thus, the Initiator's key package can include: version information and cipher suite, an ephemeral KEM public key encryption key(ekI), the Initiator's credential (credI), the Initiator's verification key(vkI), the Initiator's capabilities (capaI), and, optionally, one or more shared secret IDs (PSK ID(s)), all of which are signed with the Initiator's secret/private signature key(skI). That is, the Initiator generates a signature using its signature key over the entire contents of the Initiator key package.

An example of the structure of a key package that can be enhanced to identify one or more shared secrets (PSK(s)) is shown below.

```
struct {
  HPKEPublicKey encryption_key;
  optional<SignaturePublicKey> signature_key;
  optional<Credential> credential;
  Extension extensions<V>;
  Capabilities capabilities;
  PreSharedKeyID psks<V>;
} 2KeyPackage;
```

For an embodiment in which the Initiator's key package includes one or more proposed shared secret IDs, once the Responder receives/obtains the Initiator's key package, as shown at step 1012, upon determining that the Responder knows (has stored) at least one shared secret proposed by the Initiator, the Responder initializes the cryptographic state for epoch 1 based on the at least one shared secret/ID determined by the Responder.

The Responder can, but need not, utilize all of the same shared secret IDs/shared secrets proposed by the Initiator (if multiple shared secrets/IDs are proposed by the Initiator) for incorporation into the cryptographic state of the 2MLS channel. In various embodiments, the Responder may select only one shared secret/ID of multiple proposed by the Initiator, may select a subset of multiple shared secrets/IDs proposed by the Initiator, or may select all of multiple shared secrets/IDs as proposed by the Initiator.

Thus, at 1012, the Responder can initialize the cryptographic state for epoch 1 for the 2MLS channel utilizing at least one proposed shared secret ID and derives a responder traffic key for epoch one, called rtk1.

If the Responder agrees with the parameters of the Initiator's key package, at step 1020 the Responder creates and sends to the Initiator a Welcome message that includes each of a shared secret ID for each shared secret that the Responder has incorporated into the cryptographic state for epoch 1 of the 2MLS channel. As described above, if the Responder does not support the provided parameters, the Responder may respond with a retry message containing the Responder's key package, as described above, which may optionally include one or more shared secret IDs for one or more shared secrets proposed by the Responder.

For an embodiment in which the Initiator's key package does not include any shared secret ID(s), the Responder may determine at least one shared secret/ID known/stored by the Responder for initialization of the cryptographic state for epoch 1 for the 2MLS channel and can include the at least one shared secret ID for the at least one shared secret in the Welcome message.

Thus, the Welcome message can include a joiner_secret(at least one shared secret ID for at least one shared known/stored by the Responder (potentially as proposed by the Initiator or as proposed by the Responder), Responder's ephemeral public encryption key(ekR), Responder's verification key(vkR), Responder's credential (credR), Responder's capabilities (capaR), and one or more shared secret IDs (PSK ID(s)), all of which are signed with the Responder's signature key(skR) and encrypted with the Initiator's public ephemeral encryption key(ekI). The one or more shared secret IDs can correspond to the shared secret(s) as incorporated into the state by the Responder, which can all of the shared secret(s) proposed by the Initiator, a subset of the shared secret(s) proposed by the Initiator, or any shared secret(s) as determined by the Responder if none were proposed by the Initiator or if different from those proposed by the Initiator.

Thus, the Welcome message includes a joiner_secret, a session identifier (session_id) the Responder's key package (containing the Responder's encryption key, Responder's signature verification key), and one or more shared secret IDs, but the Responder's credential is optional. The session_id, which corresponds to the group identifier in RFC9420, and the joiner_secret may be chosen at random with length of the digest in the cipher suite.

As noted above, the Welcome message also contains a message authentication code (MAC) computed using a welcome_confirmation_key, derived from the exporter_secret, over the transcript so far, i.e., the KeyPackage and WelcomeTBM. Finally, the Welcome message contains a signature using the Responder's signature key, and all the above are encrypted using a HPKE under the Initiator's encryption_key.

An example of the structure of the Welcome message that includes one or more shared secret IDs (PSK ID(s)) is provided below.

```
struct {
  opaque joiner_secret<V>;
  opaque session_id<V>;
  uint32 epoch = 0;
  2KeyPackage key_package;
  PreSharedKeyID psks<V>;
} 2MlsWelcomeTBM;
```

As noted above, the transcript hashes used in 2MLS are different from those in MLS. 2MLS includes the full contents of the KeyPackage and Welcome in the transcript hashes, whereas MLS only includes parts of their contents. This hash over the full contents can be performed in 2MLS since there are only two parties and so all parties can agree on these contents. In particular, the welcome_transcript_hash_tbm includes all the session parameters, key material, and credentials exchanged so far in the protocol and hence contains all the elements included in the MLS GroupContext.

Once the Welcome message is sent, epoch 1 is entered. To derive the keys for this epoch, the MLS Key Schedule is run, using the joiner_secret, the one or more corresponding shared secrets for the corresponding one or more shared secret IDs, and using the welcome_transcript_hash_tbm in place of the GroupContext. The exporter_secret is then derived using one the one or more corresponding shared secrets for the corresponding one or more shared secret IDs and the exporter_secret is used to derive all other keys, including the welcome_key.

After the Initiator receives the Welcome message, at step 1022, the Initiator can initialize the state for epoch 1, including incorporating any shared secret(s) as identified in the Welcome message into the cryptographic state of the 2MLS channel, and deriving the responder traffic key, rtk1 to decrypt traffic that the Responder may send to the Initiator. That is, after sending the Welcome message, at step 1030 the Responder can send so called Early Data, encrypted under the responder traffic key, rtk1, corresponding to the early_data_secret derived from the exporter_secret. Step 1030 is entirely optional to the Responder.

The Initiator verifies the Welcome message by decrypting the (encrypted) Welcome message using the Initiator's private decryption key that corresponds to the Initiator's ephemeral public encryption key, verifying the signature of the Welcome message using the Responder's signature verification key, and then verifying the welcome tag in the Welcome message. The Initiator verifies the welcome tag by recomputing a welcome transcript to produce a recomputed welcome transcript and generating a derived welcome key from the recomputed welcome transcript. Then, the Initiator recomputes a message authentication code using the recomputed welcome transcript and the derived welcome key to produce a recomputed message authentication code. Next, the Initiator compares the recomputed message authentication code with the message authentication code of the welcome message; if they match, then the welcome tag (and thus the Welcome message) is verified.

At step 1040, after the Initiator verifies the Welcome message that it receives from the Responder, the Initiator sends a confirmation message. The confirmation (confirm) message includes a confirmation tag that is based on a message authentication code (MAC) that is computed based on a confirmation key that is derived from the exporter secret over the transcript hash.

Said another way, the Initiator generates the confirmation tag based on a MAC operation performed over a confirmation key and a hash of the welcome transcript. The confirmation key is derived from the exporter secret which is derived according to the key schedule as discussed above in connection with FIG. 3B that includes the one or more shared secrets as identified in the Welcome message received from the Responder.

After the Initiator sends the confirmation message, the Initiator derives new transport keys for epoch 1 from the exporter secret and the full transcript hash. At this point, the Initiator can start sending encrypted application data and once the Responder receives the confirmation message, the Responder stops sending Early Data and sends application traffic using rkt1 to the Initiator, as shown at step 1050. Thus, at step 1050, the Initiator and the Responder can send encrypted traffic to each other.

To summarize, the 2MLS handshake depicted in FIG. 10, illustrates various mechanisms through which one or more shared secrets (that have been provided to the endpoints via one or more OOB operations/mechanisms) can be incorporated into the state of the 2MLS channel established between a Responder and Initiator in order to enable the Initiator and Responder to send encrypted traffic to each other. If the Initiator knows the shared secret ID(s) sent by the Responder, the connection succeeds and incorporates the shared secret(s) corresponding to the shared secret ID(s). If the Initiator does not know the shared secret ID(s), the connection fails.

Broadly, the operations performed by an Initiator and Responder can be characterized as follows. For example, with regard to an Initiator (e.g., first endpoint), the operations can include receiving a welcome message from a Responder (e.g., second endpoint). More specifically, the welcome message is encrypted and comprises: welcome content including a joiner secret, a session identifier, each of one or more corresponding shared secret IDs for each of one or more corresponding shared secrets that the second endpoint has incorporated into the cryptographic state of the 2MLS channel, a second endpoint ephemeral public encryption key and a second endpoint signature verification key; a welcome tag that is a message authentication code computed over a welcome transcript using a welcome key derived from the joiner secret, wherein the welcome transcript comprises a first endpoint key package and the welcome content; and a signature computed over the welcome content and the welcome tag using a second endpoint signature key.

The first endpoint can verify the welcome message. This involves the first endpoint: decrypting the welcome message using a first endpoint private decryption key that corresponds to a first endpoint ephemeral public encryption key(that is part of the first endpoint key package which the second endpoint has obtained); verifying the signature of the welcome message using the second endpoint signature verification key; and verifying the welcome tag in the welcome message.

Upon the first endpoint verifying the welcome message, the first endpoint sends to the second endpoint a confirmation message that confirms the one-to-one secure channel.

The operations may further include the first endpoint and the second endpoint engaging in (conducting) secure communications using transport encryption keys derived from a key schedule that includes the one or more corresponding shared secrets for the corresponding one or more shared secret IDs identified in the welcome message.

Verifying the welcome tag includes: recomputing a welcome transcript to produce a recomputed welcome transcript and generating a derived welcome key from the recomputed welcome transcript, recomputing a message authentication code using the recomputed welcome transcript and the derived welcome key to produce a recomputed message authentication code, and comparing the recomputed message authentication code with the message authentication code of the welcome message. When the recomputed message authentication code and the message authentication code of the welcome message match, the welcome tag (and thus the welcome message) is verified.

The operations further include the first endpoint: generating a confirmation tag based on a message authentication code operation performed over a confirmation key and a hash of the welcome transcript, wherein the confirmation key is derived from an exporter secret; and including the confirmation tag in the confirmation message. The exporter secret is derived, at least in part, using the one or more corresponding shared secrets for the corresponding one or more shared secret IDs included in the welcome message.

The operations may further involve the first endpoint deriving, from the exporter secret, new transport keys for secure messages to be sent to the second endpoint in a next epoch.

As described above, the first endpoint may derive from the exporter secret, new transport keys to use for secure messages to the sent to the second endpoint in a next epoch.

Turning now to Responder (e.g., second endpoint) operations, various operations can be performed by the second endpoint in the one-to-one secure (2MLS) channel handshake. For example, the operations can include the second endpoint obtaining a first endpoint key package. The first endpoint key package includes a first endpoint ephemeral public encryption key and a first endpoint signature verification key corresponding to a first endpoint signature key, wherein the first endpoint key package is signed with the first endpoint signature key. In at least one embodiment, the key package further includes each of one or more corresponding shared secret IDs for each of one or more corresponding shared secrets proposed by the first endpoint to be incorporated into the cryptographic state of the 2MLS channel.

The second endpoint verifies a signature of the first endpoint key package using the first endpoint signature verification key included in the key package.

The operations performed by the second endpoint include generating a welcome message to be sent to the first endpoint. The welcome message comprises: welcome content including a joiner secret, a session identifier, one or more corresponding shared secret IDs for each of one or more corresponding shared secrets that the second endpoint has incorporated into the cryptographic state of the 2MLS channel, a second endpoint ephemeral public encryption key and a second endpoint signature verification key; a welcome tag that is a message authentication code computed over a welcome transcript using a welcome key derived from the joiner secret, wherein the welcome transcript comprises the first endpoint key package and the welcome content; and a signature computed over the welcome content and welcome tag using a second endpoint signature key.

The operations performed by the second endpoint include encrypting the welcome message using the first endpoint ephemeral public encryption key to produce an encrypted welcome message and transmitting the encrypted welcome message to the first endpoint.

The operations further include, upon the first endpoint decrypting the welcome message, verifying the signature of the welcome message using the second endpoint signature verification key, and verifying the welcome tag by recomputing a message authentication code using the welcome transcript and the welcome key, receiving from the first endpoint a confirmation message.

Obtaining the first endpoint key package may involve obtaining the first endpoint key package in a message received from the first endpoint or by downloading the key package from a server. The operations may further include engaging in secure communications between the first endpoint and the second endpoint using transport encryption keys derived from a key schedule.

As described above, the 2MLS handshake described above is executed between an Initiator and a Responder for establishing a 2MLS channel, and results in the two parties having shared cryptographic state that is derived based on one or more shared secrets that have been provided for the parties using one or more OOB operations/mechanisms as discussed for embodiments herein in which the parties can use the cryptographic state encrypt content within the secure 2MLS channel. When the transport protocol has a notion of an Initiator and a Responder, these may be different from the 2MLS roles. The 2MLS protocol is defined in terms of messages sent by each party in a particular order.

With reference to FIG. 11, FIG. 11 is a sequence diagram depicting example operations for determining, between two parties (an Initiator and a Responder), at least one particular shared secret to be incorporated into a cryptographic state of a one-to-one secure (2MLS) channel via a key update process 1100, according to an example embodiment.

As noted above, each epoch creates a new exporter_secret and a new confirm_transcript_hash and the transport_secret is derived in the same way as described above. At any point after the initial handshake, either party can ratchet the protocol to obtain a fresh key, providing forward secrecy (FS) and post-compromise security (PCS). Thus, as shown at 1110, the Initiator and Responder are communicating application traffic for epoch N using the Initiator transport key itk (N) and the Responder transport key rtk(N).

At some point, one of the parties decides to update the keys for communicating with the other party. In at least one embodiment for the example shown in FIG. 11, the Responder may be the party that initiates the key update via a PreSharedKeyProposal message, as shown at 1120, but this is only an example as the Initiator could just was well trigger the key update.

The PreSharedKeyProposal message can include one or more shared secret IDs for one or more shared secrets known/stored by the Responder that the Responder proposes for incorporation to the cryptographic state of the 2MLS channel. The PreSharedKeyProposal message is subject to a message authentication code (MAC) computation using the previous confirm_transcript_hash as context, signed with the Initiator's signature key(skI) and encrypted with the peer's encryption key, in this case the Responder's encryption key(ekR), using the same pattern as the discussed above for the Welcome message:

```
struct {
  opaque session__id<V>;
  uint32 epoch;
  PreSharedKeyID psks<V>;
} 2MlsPreSharedKeyProposalTBM;
struct {
  2MlsPreSharedKeyProposalTBM proposal__tbm;
  /* MAC(proposal__key, proposal__transcript__hash__tbm) */
  Mac proposal__tag;
} 2MlsPreSharedKeyProposalTBS;
struct {
  2MlsPreSharedKeyProposalTBS proposal__tbs;
  /*SignWithLabel(signing__key, "2MlsSecretProposal",
  2MlsSecretProposalTBS)*/
  optional<opaque> signature<V>;
} 2MlsPreSharedKeyProposalTBE;
```

As shown at 1130, the Initiator can send an update message, either through its own volition or in response to receiving a PreSharedKeyProposal from the Responder (e.g., 1120). The update message includes a fresh commit_secret for the next epoch, a new key package containing a fresh encryption key, each of one or more corresponding shared secret IDs (PSK ID(s)) for each of one or more corresponding shared secrets proposed by the Initiator for incorporation into the cryptographic state of the 2MLS channel, and (optionally) a new credential and signature key.

The Initiator can, but need not, include in the update message all of the same shared secret ID(s)/shared secret(s) proposed by the Responder for incorporation into the cryptographic state of the 2MLS channel. In various embodiments, the Initiator may include in the update message only one shared secret/ID of multiple proposed by the Responder, may select a subset of multiple shared secrets/IDs proposed by the Responder, or may select all of multiple shared secrets/IDs proposed by the Responder.

The update message is subject to a message authentication code (MAC) computation using the previous confirm_transcript_hash as context, signed with the Initiator's signature key (skI) and encrypted with the peer's encryption key, in this case the Responder's encryption key (ekR), using the same pattern as the discussed above for the Welcome message:

```
struct {
  opaque commit__secret<V>;
  opaque session__id<V>;
  uint32 epoch;
  2MlsSenderKeyPackage new__key__package;
  PreSharedKeyID psks<V>;
} 2MlsUpdateTBM;
```

If the new_key_package does not contain a new signature key, then the signature field in update_tbs is left empty.

At step 1132, the Responder re-runs the key schedule to derive new keys for the new epoch, N+1, using the previous init_secret, the new commit_secret, one or more corresponding shared secrets for one or more corresponding shared secret IDs included in the update message, and using the update_transcript_hash_tbm as the new GroupContext. This yields a new exporter_secret that is used to derive the update_key. Thus, if the commit is accepted, the two parties update to new keys that incorporate the entry from the PSK(s).

Upon receiving the update message, the peer, in this case the Responder, responds, at step 1140, with a confirmation message that includes the confirmation tag computing using the key derivation in the manner as discussed above at 430 of FIG. 4. Then the confirm_transcript_hash is updated.

At step 1142, the Initiator can now derive the transport keys rtk(N+1) and itk (N+1) for the new epoch (epoch N+1) using the exporter_secret and the new confirm_transcript_hash.

After receiving and checking the update confirmation message from the other party, the updating party needs to switch to the new epoch and transport keys. Until the confirmation message is processed, the old keys are being used.

At 1150, the Initiator and Responder can now send application traffic encrypted with the new transport keys, itk (N+1) and rtk(N+1), respectively.

As discussed above for FIG. 4, in the event that both sides send an update message, each side will recognize the conflict and refuse to send a confirmation message. After a period of time, each side will notice that it has not received a confirmation message from the other side and retry the update.

Accordingly, in accordance with embodiments herein, the first endpoint or the second endpoint may initiate a key update by sending to the other endpoint (the other of the first endpoint or second endpoint) an update message that contains a fresh commit secret for a next epoch, each of one or more corresponding shared secret IDs for each of one or more corresponding shared secrets sought to be incorporated into the cryptographic state of a 2MLS channel, and a new key package that includes a fresh encryption key that is signed with a signature key of the first endpoint or the second endpoint that sent the update message, and encrypted with an encryption key of the other endpoint. When the other endpoint receives the update message, the other endpoint performs operations of: generating a confirmation key from an exporter secret over the hash of the welcome transcript; generating a confirmation tag based on a message authentication code operation performed over the confirmation key; and sending a confirmation message containing the confirmation tag, wherein the first endpoint and the second endpoint derive, from the exporter secret and the transcript hash, new transport keys for secure messages to be sent to the other endpoint in a next epoch. The exporter secret is derived from each of one or more corresponding shared secrets for each of one or more corresponding shared secret IDs included in the update message.

In some embodiments, the first endpoint or the second endpoint can transmit a shared secret proposal to the other of the first or the second endpoint that includes each identifier for each of the at least one particular shared secret that is proposed to be incorporated into the cryptographic state of the one-to-one secure channel and initiating a commit exchange from the other first endpoint or the second endpoint that includes each identifier for each of the at least one particular shared secret that is to be incorporated into the cryptographic state of the one-to-one secure channel.

Example User Device/Endpoint

Figure 12:
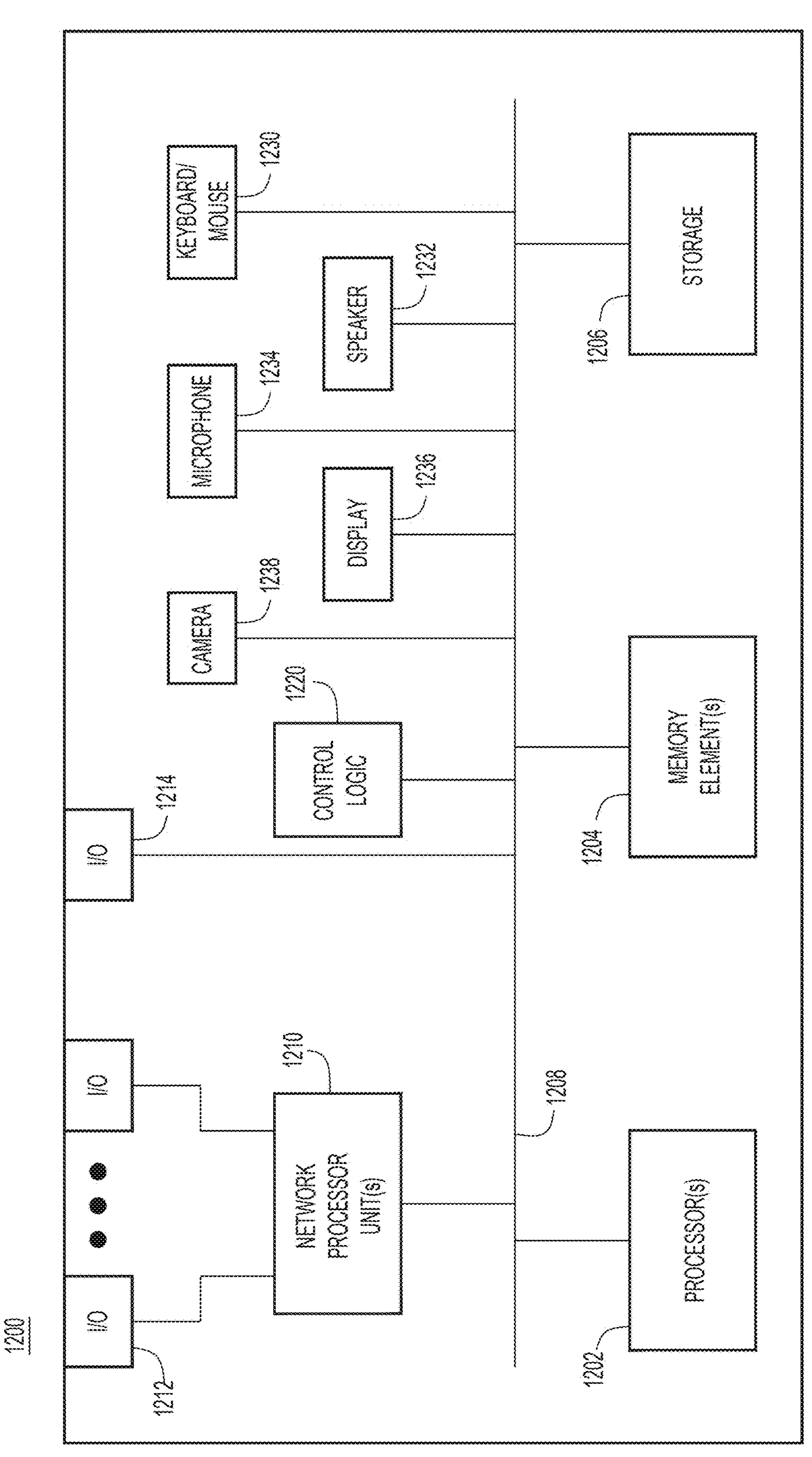
FIG. 12 is a block diagram of a device that may be configured to operate as either an Initiator or Responder in connection with the one-to-one secure channel communication techniques, according to an example embodiment.

FIG. 12 illustrates a hardware block diagram of a device 1200 that may perform functions associated with operations discussed herein in connection with the techniques depicted in FIGS. 1, 2A, 2B, 2C, 3A, 3B, 4, 5, 6A, 6B, 7A, 7B, and 8, 9A, 9B, 10, and 11. The device 1200 shown in FIG. 12 thus may be representative of a user device or endpoint that may be configured to perform the various 2MLS related operations described herein.

In at least one embodiment, the device 1200 may be any apparatus that may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for device 1200 can overlap in any manner and are not limited to the specific allocation of instructions and/or operations described herein.

In at least one embodiment, processor(s) 1202 is/are at least one hardware processor configured to execute various tasks, operations and/or functions for device 1200 as described herein according to software and/or instructions configured for device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with device 1200, and/or logic configured for memory element(s) 1204 and/or storage 1206. For example, any logic described herein (e.g., control logic 1220) can, in various embodiments, be stored for device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of device 1200 to communicate in order to exchange information and/or data. Bus 1208 can be implemented with any architecture designed for passing control, data and/or information between processors, memory elements/storage, peripheral devices, and/or any other hardware and/or software components that may be configured for device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

To enable interface with a user in order to allow a user to enter content (text, images, video, etc.) to be transmitted and to receive and present content from a far end device, The device 1200 may further include a keyboard/mouse 1230, a speaker 1232, a microphone 1234, a display 1236 and a camera 1238 (e.g., a video camera). The display 1236 may have touch-screen input capabilities, making the keyboard/mouse 1230 unnecessary.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein. In particular, the control logic 1220 or other software instructions stored in memory elements 1204, may include instructions that, when executed by the processor(s) 1202, enable the device 1200 to perform the 2MLS and shared secret operations described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Accordingly, embodiments herein may provide for improving the security of a 2MLS connection by feeding it additional entropy from a higher security channel and/or operations. In various instances, a 2MLS session provided in accordance with embodiments herein can include one/multiple shared secrets/PSKs identified through the initial handshake, multiple subsequent commits containing shared secrets/PSKs, and/or one/multiple shared secrets/PSKs per commit.

In summary, presented herein is a method, apparatus, and non-transitory computer readable storage media (encoded with instructions to be executed by a processor) that, when executed by the processor, cause the processor to perform operations, comprising: providing one or more shared secrets to be stored by a first endpoint and a second endpoint through one or more out-of-band (OOB) operations that are external to operations between the first endpoint and second endpoint involving a one-to-one secure channel through which secure communications are capable of being exchanged between the first endpoint and the second endpoint, wherein the one-to-one secure channel allows incorporation of the one or more shared secrets into a cryptographic state of the one-to-one secure channel through both of a one-to-one secure channel handshake and through a key update process; determine, by the first endpoint and the second endpoint, at least one particular shared secret of the one or more shared secrets that is to be incorporated into the cryptographic state of the one-to-one secure channel, wherein the determining comprises providing each of an identifier for each of the at least one particular shared secret from one of the first endpoint or the second endpoint to the other of the first endpoint or the second endpoint via at least one of the one-to-one secure channel handshake or the key update process; and engaging in secure communications between the first endpoint and the second endpoint via the one-to-one secure channel based on the cryptographic state incorporating the at least one particular shared secret.

In at least one instance, the one or more OOB operations include establishing a quantum key distribution (QKD) shared secrets channel for the first endpoint and the second endpoint. In at least one instance, the at least one particular shared secret comprises a stream of shared secret bytes provided for the QKD shared secrets channel and the identifier of the at least one particular shared secret identifies: the QKD shared secrets channel; and a starting byte and an ending byte within the stream of shared secret bytes that define a shared secret value for the at least one particular shared secret.

In at least one instance a value for the at least one particular shared secret that is incorporated into the cryptographic state of the one-to-one secure channel is derived from the at least one particular shared secret using a hash function or a key derivation function.

In at least one instance, the one or more OOB operations include performing one or more wireless communications between the first endpoint and the second endpoint through which the one or more shared secrets are communicated between the first endpoint and the second endpoint. In at least one instance, the identifier for the at least one particular shared secret identifies at least one of: location information for a location at which the wireless communications occurred; temporal information for at least one of a time or a day at which the wireless communications occurred; user information for at least one of a first user of the first endpoint or a second user of the second endpoint; an index indicator for the at least one particular shared secret; or a value that is derived from the at least one particular shared secret using a hash function or a key derivation function.

In at least one instance, the one or more OOB operations include: generating a quick-response (QR) code by one of the first endpoint or the second endpoint, wherein the QR code includes the one or more shared secrets; capturing the QR code by the other of the first endpoint or the second endpoint; and decoding the QR code by the other of the first endpoint or the second endpoint to obtain and store the one or more shared secrets. In at least one instance, the identifier for the at least one particular shared secret identifies at least one of: location information for a location at which the QR code was generated or captured; temporal information for at least one of a time or a day at which the QR code was generated or captured; user information for at least one of a first user of the first endpoint or a second user of the second endpoint; an index indicator for the at least one particular shared secret; or a value that is derived from the at least one particular shared secret using a hash function or a key derivation function.

In at least one instance, the one or more OOB operations include performing a measurement of a physical phenomenon observed by at least one of the first endpoint and the second endpoint. In at least one instance, the identifier for the at least one particular shared secret identifies at least one of: location information for a location at which the measurement is performed; temporal information for at least one of a time or a day at which the measurement is performed; user information for at least one of a first user of the first endpoint or a second user of the second endpoint; an index indicator for the at least one particular shared secret; or a value that is derived from the at least one particular shared secret using a hash function or a key derivation function.

In at least one instance, the one or more OOB operations include providing a plurality of shared secret bytes for the first endpoint and the second endpoint and the identifier for the at least one particular shared secret is at least one of: a file name associated with the plurality of shared secret bytes; or a starting byte and an ending byte within the plurality of shared secret bytes that define a shared secret value for the at least one particular shared secret.

In at least one instance, determining the at least one particular shared secret via the one-to-one secure handshake includes: providing a welcome message from the second endpoint to the first endpoint that includes each identifier for each the at least one particular shared secret that is to be incorporated into the cryptographic state of the one-to-one secure channel; and obtaining a response message by the second endpoint from the first endpoint as a confirmation that each of the at least one particular shared secret is incorporated into the cryptographic state of the one-to-one secure channel.

In at least one instance, determining the at least one particular shared secret via the key update process includes: performing a commit exchange between the first endpoint and the second endpoint via the one-to-one secure channel that includes each identifier for each of the at least one particular shared secret that is to be incorporated into the cryptographic state of the one-to-one secure channel; or transmitting a shared secret proposal by one of the first endpoint or the second endpoint to the other of the first endpoint or the second endpoint via the one-to-one secure channel that includes each identifier for each of the at least one particular shared secret that is proposed to be incorporated into the cryptographic state of the one-to-one secure channel and initiating a commit exchange from the other of the first endpoint or the second endpoint that includes each identifier for each of the at least one particular shared secret that is to be incorporated into the cryptographic state of the one-to-one secure channel.

In at least one instance, the one-to-one secure channel is a 2MLS channel.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:

providing one or more shared secrets to be stored by a first endpoint and a second endpoint through one or more out-of-band (OOB) operations that are external to operations between the first endpoint and second endpoint involving a one-to-one secure channel through which secure communications are capable of being exchanged between the first endpoint and the second endpoint, wherein the one-to-one secure channel allows incorporation of the one or more shared secrets into a cryptographic state of the one-to-one secure channel through both of a one-to-one secure channel handshake and through a key update process;

determining, by the first endpoint and the second endpoint, at least one particular shared secret of the one or more shared secrets that is to be incorporated into the cryptographic state of the one-to-one secure channel, wherein the determining comprises providing each of an identifier for each of the at least one particular shared secret from one of the first endpoint or the second endpoint to the other of the first endpoint or the second endpoint via at least one of the one-to-one secure channel handshake or the key update process in which the one-to-one secure handshake or the key update process includes providing a confirmation message from one of the first endpoint or the second endpoint to the other of the first endpoint or the second endpoint in response to a welcome message or a commit message being received by the first endpoint or the second endpoint in which the confirmation message confirms to the other of the first endpoint or the second endpoint that each of the at least one particular shared secret is incorporated into the cryptographic state of the one-to-one secure channel, wherein the confirmation message includes a message authentication code computed from a confirmation key derived from each of the at least one particular shared secret and a transcript of prior communications exchanged between the first endpoint and the second endpoint for the one-to-one secure channel handshake or the key update process; and engaging in secure communications between the first endpoint and the second endpoint via the one-to-one secure channel based on the cryptographic state incorporating the at least one particular shared secret.

2. The method of claim 1, wherein the one or more OOB operations include establishing a quantum key distribution (QKD) shared secrets channel for the first endpoint and the second endpoint.

3. The method of claim 2, wherein the at least one particular shared secret comprises a stream of shared secret bytes provided for the QKD shared secrets channel and the identifier of the at least one particular shared secret identifies:

the QKD shared secrets channel; and a starting byte and an ending byte within the stream of shared secret bytes that define a shared secret value for the at least one particular shared secret.

4. The method of claim 1, wherein a value for the at least one particular shared secret is derived from the at least one particular shared secret using a hash function or a key derivation function prior to incorporating the value for the at least one particular shared secret into the cryptographic state of the one-to-one secure channel.

5. The method of claim 1, wherein the one or more OOB operations include performing one or more wireless communications between the first endpoint and the second endpoint through which the one or more shared secrets are communicated between the first endpoint and the second endpoint.

6. The method of claim 5, wherein the identifier for the at least one particular shared secret identifies at least one of:

location information for a location at which the wireless communications occurred;

temporal information for at least one of a time or a day at which the wireless communications occurred;

user information for at least one of a first user of the first endpoint or a second user of the second endpoint;

an index indicator for the at least one particular shared secret; or a value that is derived from the at least one particular shared secret using a hash function or a key derivation function.

7. The method of claim 1, wherein the one or more OOB operations include:

generating a quick-response (QR) code by one of the first endpoint or the second endpoint, wherein the QR code includes the one or more shared secrets;

capturing the QR code by the other of the first endpoint or the second endpoint; and decoding the QR code by the other of the first endpoint or the second endpoint to obtain and store the one or more shared secrets.

8. The method of claim 7, wherein the identifier for the at least one particular shared secret identifies at least one of:

location information for a location at which the QR code was generated or captured;

temporal information for at least one of a time or a day at which the QR code was generated or captured;

user information for at least one of a first user of the first endpoint or a second user of the second endpoint;

an index indicator for the at least one particular shared secret; or a value that is derived from the at least one particular shared secret using a hash function or a key derivation function.

9. The method of claim 1, wherein the one or more OOB operations include performing a measurement of a physical phenomenon observed by at least one of the first endpoint and the second endpoint.

10. The method of claim 9, wherein the identifier for the at least one particular shared secret identifies at least one of:

location information for a location at which the measurement is performed;

temporal information for at least one of a time or a day at which the measurement is performed;

user information for at least one of a first user of the first endpoint or a second user of the second endpoint;

an index indicator for the at least one particular shared secret; or a value that is derived from the at least one particular shared secret using a hash function or a key derivation function.

11. The method of claim 1, wherein the one or more OOB operations include providing a plurality of shared secret bytes for the first endpoint and the second endpoint and the identifier for the at least one particular shared secret is at least one of:

a file name associated with the plurality of shared secret bytes; or a starting byte and an ending byte within the plurality of shared secret bytes that define a shared secret value for the at least one particular shared secret.

12. The method of claim 1, wherein determining the at least one particular shared secret via the one-to-one secure handshake includes:

providing a welcome message from the second endpoint to the first endpoint that includes each identifier for each the at least one particular shared secret that is to be incorporated into the cryptographic state of the one-to-one secure channel; and obtaining the confirmation message by the second endpoint from the first endpoint as a confirmation that each of the at least one particular shared secret is incorporated into the cryptographic state of the one-to-one secure channel.

13. The method of claim 1, wherein determining the at least one particular shared secret via the key update process includes:

obtaining the commit message from the other of the first endpoint or the second endpoint via the one-to-one secure channel that includes each identifier for each of the at least one particular shared secret that is to be incorporated into the cryptographic state of the one-to-one secure channel and sending the confirmation message to the other of the first endpoint or the first second endpoint; or transmitting a shared secret proposal by one of the first endpoint or the second endpoint to the other of the first endpoint or the second endpoint via the one-to-one secure channel that includes each identifier for each of the at least one particular shared secret that is proposed to be incorporated into the cryptographic state of the one-to-one secure channel, obtaining the commit message from the other of the first endpoint or the second endpoint that includes each identifier for each of the at least one particular shared secret that is to be incorporated into the cryptographic state of the one-to-one secure channel, and sending the confirmation message to the other of the first endpoint or the second endpoint.

14. The method of claim 1, wherein the one-to-one secure channel is a 2MLS channel.

15. One or more non-transitory computer readable storage media encoded with instructions that, when executed by a processor, cause the processor to perform operations, comprising:

providing one or more shared secrets to be stored by a first endpoint and a second endpoint through one or more out-of-band (OOB) operations that are external to operations between the first endpoint and second endpoint involving a one-to-one secure channel through which secure communications are capable of being exchanged between the first endpoint and the second endpoint, wherein the one-to-one secure channel allows incorporation of the one or more shared secrets into a cryptographic state of the one-to-one secure channel through both of a one-to-one secure channel handshake and through a key update process;

determining, by the first endpoint and the second endpoint, at least one particular shared secret of the one or more shared secrets that is to be incorporated into the cryptographic state of the one-to-one secure channel, wherein the determining comprises providing each of an identifier for each of the at least one particular shared secret from one of the first endpoint or the second endpoint to the other of the first endpoint or the second endpoint via at least one of the one-to-one secure channel handshake or the key update process in which the one-to-one secure handshake or the key update process includes providing a confirmation message from one of the first endpoint or the second endpoint to the other of the first endpoint or the second endpoint in response to a welcome message or a commit message being received by the first endpoint or the second endpoint in which the confirmation message confirms to the other of the first endpoint or the second endpoint that each of the at least one particular shared secret is incorporated into the cryptographic state of the one-to-one secure channel, wherein the confirmation message includes a message authentication code computed from a confirmation key derived from each of the at least one particular shared secret and a transcript of prior communications exchanged between the first endpoint and the second endpoint for the one-to-one secure channel handshake or the key update process; and engaging in secure communications between the first endpoint and the second endpoint via the one-to-one secure channel based on the cryptographic state incorporating the at least one particular shared secret.

16. The media of claim 15, wherein a value for the at least one particular shared secret that is incorporated into the cryptographic state of the one-to-one secure channel is derived from the at least one particular shared secret using a hash function or a key derivation function.

17. An apparatus comprising:

at least one memory element for storing data; and at least one processor for executing instructions associated with the data, wherein executing the instructions causes the apparatus to perform operations, comprising:

providing one or more shared secrets to be stored by a first endpoint and a second endpoint through one or more out-of-band (OOB) operations that are external to operations between the first endpoint and second endpoint involving a one-to-one secure channel through which secure communications are capable of being exchanged between the first endpoint and the second endpoint, wherein the one-to-one secure channel allows incorporation of the one or more shared secrets into a cryptographic state of the one-to-one secure channel through both of a one-to-one secure channel handshake and through a key update process;

determining, by the first endpoint and the second endpoint, at least one particular shared secret of the one or more shared secrets that is to be incorporated into the cryptographic state of the one-to-one secure channel, wherein the determining comprises providing each of an identifier for each of the at least one particular shared secret from one of the first endpoint or the second endpoint to the other of the first endpoint or the second endpoint via at least one of the one-to-one secure channel handshake or the key update process in which the one-to-one secure handshake or the key update process includes providing a confirmation message from one of the first endpoint or the second endpoint to the other of the first endpoint or the second endpoint in response to a welcome message or a commit message being received by the first endpoint or the second endpoint in which the confirmation message confirms to the other of the first endpoint or the second endpoint that each of the at least one particular shared secret is incorporated into the cryptographic state of the one-to-one secure channel, wherein the confirmation message includes a message authentication code computed from a confirmation key derived from each of the at least one particular shared secret and a transcript of prior communications exchanged between the first endpoint and the second endpoint for the one-to-one secure channel handshake or the key update process; and engaging in secure communications between the first endpoint and the second endpoint via the one-to-one secure channel based on the cryptographic state incorporating the at least one particular shared secret.

18. The apparatus of claim 17, wherein a value for the at least one particular shared secret is derived from the at least one particular shared secret using a hash function or a key derivation function prior to incorporating the value for the at least one particular shared secret into the cryptographic state of the one-to-one secure channel.

19. The apparatus of claim 17, wherein the one-to-one secure channel is a 2MLS channel.

20. The apparatus of claim 17, wherein the apparatus is one of the first endpoint or the second endpoint.

* * * * *